(12) United States Patent
Fujita

(10) Patent No.: US 9,996,895 B2
(45) Date of Patent: Jun. 12, 2018

(54) IMAGE DISPLAY SYSTEM, INFORMATION PROCESSING APPARATUS, AND IMAGE DISPLAY METHOD

(71) Applicant: Yohei Fujita, Kanagawa (JP)

(72) Inventor: Yohei Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 18 days.

(21) Appl. No.: 15/135,706

(22) Filed: Apr. 22, 2016

(65) Prior Publication Data

US 2016/0321779 A1 Nov. 3, 2016

(30) Foreign Application Priority Data

May 1, 2015 (JP) .................................. 2015-094225
Feb. 16, 2016 (JP) .................................. 2016-026816

(51) Int. Cl.
*G06K 9/36* (2006.01)
*G06K 9/20* (2006.01)
(Continued)

(52) U.S. Cl.
CPC ....... *G06T 3/0018* (2013.01); *H04N 21/2662* (2013.01); *H04N 21/6587* (2013.01);
(Continued)

(58) Field of Classification Search
None
See application file for complete search history.

(56) References Cited

U.S. PATENT DOCUMENTS 7,058,239 B2 * 6/2006 Singh ..................... G02B 13/06
348/36

9,361,283 B2 * 6/2016 Jones ..................... G06F 17/241
(Continued)

FOREIGN PATENT DOCUMENTS

| EP | 2669866 | 12/2013 |
|---|---|---|
| JP | 2005-167397 | 6/2005 |
| JP | 2008-022488 | 1/2008 |

OTHER PUBLICATIONS

Mobotix et al: "Q24M: Camera Manual HiRes Video Innovations Mobotix AG @BULLET D-67722 Langmeil @BULLET Tel: +49-6302-9816-103 @BULLET Fax: +49-6302-9816-190 @BULLET sales@mobotix.com High-resolution 180° Panorama", Jun. 25, 2009, Retrieved from the Internet: URL:http://www.eavs-groupe.fr/downloads/dl/file/id/2163/q24m.pdf.

(Continued)

*Primary Examiner* — Feng Niu
(74) *Attorney, Agent, or Firm* — IPUSA, PLLC

(57) ABSTRACT

An image display system is provided that includes an information processing apparatus and a terminal apparatus that receives a wide-angle image from the information processing apparatus. The information processing apparatus includes a region determining unit that determines a region of the wide-angle image that is viewed less frequently than other regions of the wide-angle image, a reduction unit that deletes the region determined as less frequently viewed by the region determining unit from the wide-angle image to generate a reduced wide-angle image, and a first transmitting unit that transmits the reduced wide-angle image generated by the reduction unit to the terminal apparatus. The terminal apparatus includes a receiving unit that receives the reduced wide-angle image from the information processing apparatus, and an image display unit that displays the reduced wide-angle image on a display device.

16 Claims, 25 Drawing Sheets

(51) Int. Cl.
*G06T 3/00* (2006.01)
*H04N 21/2662* (2011.01)
*H04N 21/6587* (2011.01)
*H04N 21/845* (2011.01)
*H04N 21/258* (2011.01)

(52) U.S. Cl.
CPC . *H04N 21/845* (2013.01); *G06T 2207/20132* (2013.01); *H04N 21/25891* (2013.01)

(56) References Cited

U.S. PATENT DOCUMENTS

| | | | |
|---|---|---|---|
| 9,584,789 B2* | 2/2017 | Suzuki | H04N 9/87 |
| 2002/0021353 A1 | 2/2002 | DeNies | |
| 2013/0322844 A1* | 12/2013 | Suzuki | H04N 9/87 |
| | | | 386/230 |
| 2015/0178257 A1* | 6/2015 | Jones | G06F 17/241 |
| | | | 345/419 |
| 2015/0373296 A1* | 12/2015 | Ushiyama | H04N 5/765 |
| | | | 725/91 |

OTHER PUBLICATIONS

Extended European Search Report dated Oct. 10, 2016.

* cited by examiner

FIG.8A

NUMBER OF VIEWERS = 15

| 1. (0) | 2. (2) | 3. (1) | 4. (2) | 5. (3) | 6. (1) |
|---|---|---|---|---|---|
| 7. (2) | 8. (2) | 9. (3) | 10. (3) | 11. (5) | 12. (2) |
| 13. (9) | 14. (8) | 15. (9) | 16. (9) | 17. (8) | 18. (9) |
| 19. (9) | 20. (9) | 21. (8) | 22. (9) | 23. (8) | 24. (9) |
| 25. (3) | 26. (3) | 27. (6) | 28. (6) | 29. (3) | 30. (2) |

FIG.8B

| 13. (9) | 14. (8) | 15. (9) | 16. (9) | 17. (8) | 18. (9) |
|---|---|---|---|---|---|
| 19. (9) | 20. (9) | 21. (8) | 22. (9) | 23. (8) | 24. (9) |

FIG.8C

|  |  |  |  | 11. (5) |  |
|---|---|---|---|---|---|
| 13. (9) | 14. (8) | 15. (9) | 16. (9) | 17. (8) | 18. (9) |
| 19. (9) | 20. (9) | 21. (8) | 22. (9) | 23. (8) | 24. (9) |
|  |  | 27. (6) | 28. (6) |  |  |

IMAGE DISPLAY SYSTEM, INFORMATION PROCESSING APPARATUS, AND IMAGE DISPLAY METHOD

BACKGROUND OF THE INVENTION

1. Field of the Invention

The present invention relates to an image display system, an information processing apparatus, and an image display method.

2. Description of the Related Art

So-called spherical images or omnidirectional images that are 360-degree panoramic images of a scene are known (hereinafter simply referred to as "omnidirectional image"). By using a dedicated imaging apparatus having a special optical system, a user may be able to capture an omnidirectional image in one shot. A user can also obtain an omnidirectional image using a normal imaging apparatus that captures a rectangular image by stitching together a plurality of images. As described above, an omnidirectional image is a 360-degree image with substantially no blind angle, and a user may selectively display/view a given region (angle) of the omnidirectional image on a display or the like, for example.

Also, if an omnidirectional image is provided on the Internet or the like, the user can download and view the omnidirectional image using a PC (Personal Computer), for example. However, the data size of an omnidirectional image tends to be rather large because it captures a 360-degree field of view. Thus, when a user wishes to view an omnidirectional image via the Internet, for example, it may take some time to download the omnidirectional image such that the waiting time required for displaying the omnidirectional image tends to be long.

A technique for reducing the download time for downloading image data is known that involves having a server deliver progressive images to a terminal or the like (e.g., see Japanese Laid-Open Patent Publication No. 2008-022488). More specifically, Japanese Laid-Open Patent Publication No. 2008-022488 describes a server that starts by transmitting a low-resolution image with a small data size and progressively transmits higher-resolution images with a larger data size.

However, in the technique that involves having the server transmit progressive images, the image initially displayed by the user on the PC is a low-resolution image, and the user still has to wait for a long time before a suitable high-resolution image is displayed. Thus, for example, because a low-resolution image is initially presented to the user, the user may not form a good impression on the website from which the image is downloaded, or the user may fall under the misconception that the image quality of the actual image provided by the website is a low-quality image.

SUMMARY OF THE INVENTION

An aspect of the present invention provides an image display system that is capable of reducing the time required for delivering a wide-angle image.

According to one embodiment of the present invention, an image display system is provided that includes an information processing apparatus and a terminal apparatus that receives a wide-angle image from the information processing apparatus. The information processing apparatus includes a region determining unit that determines a region of the wide-angle image that is viewed less frequently than other regions of the wide-angle image, a reduction unit that deletes the region determined as less frequently viewed by the region determining unit from the wide-angle image to generate a reduced wide-angle image, and a first transmitting unit that transmits the reduced wide-angle image generated by the reduction unit to the terminal apparatus. The terminal apparatus includes a receiving unit that receives the reduced wide-angle image from the information processing apparatus, and an image display unit that displays the reduced wide-angle image on a display device.

BRIEF DESCRIPTION OF THE DRAWINGS

FIGS. 8A-8C are tables schematically showing example records of the number of times each cell of an omnidirectional image has been viewed;

DESCRIPTION OF EMBODIMENTS

In the following, embodiments of the present invention are described with reference to the accompanying drawings.

[First Embodiment]

<Image Processing by Image Display System>

Figure 1:
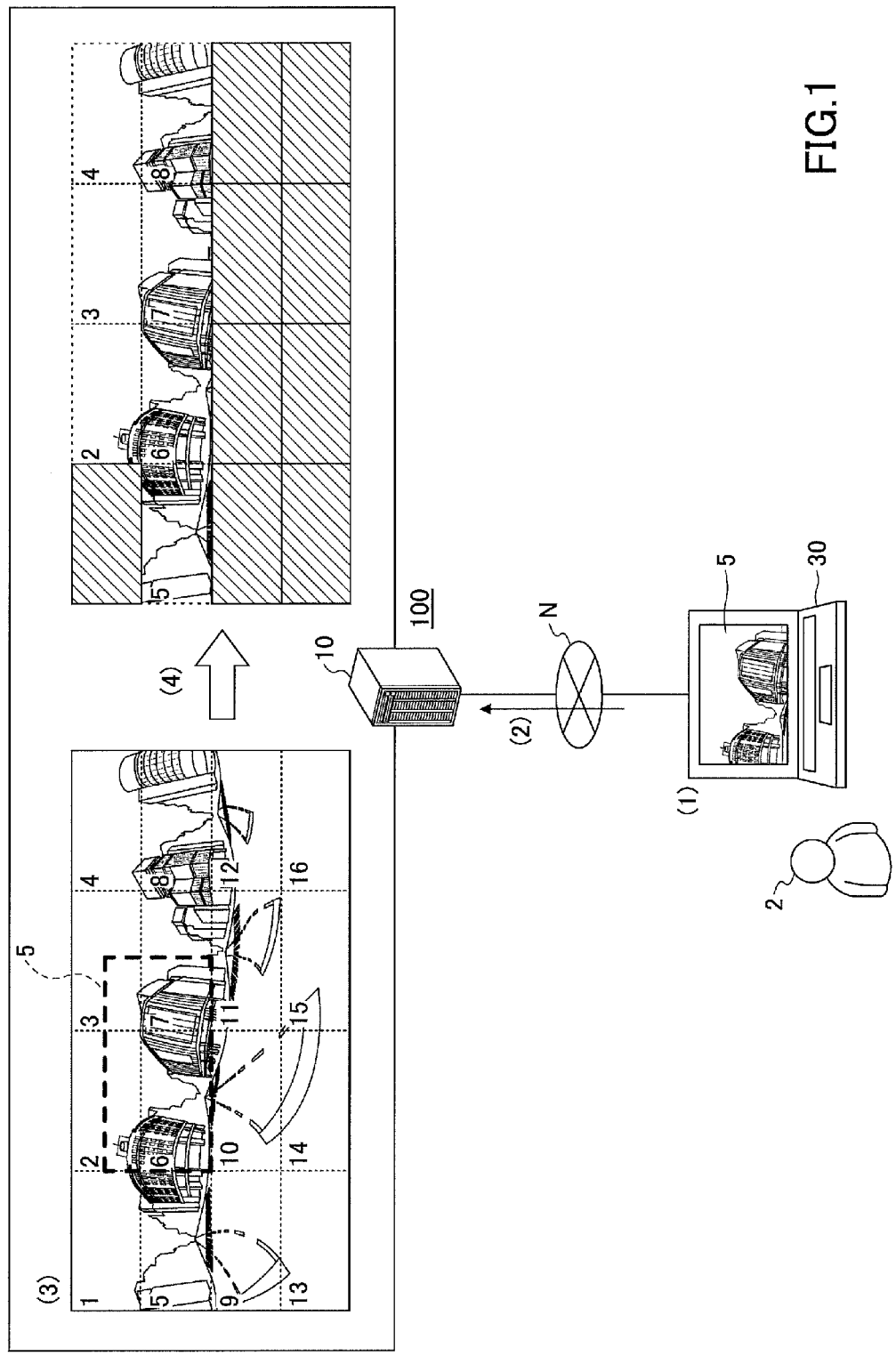
FIG. 1 is a diagram schematically showing an example of an image processing procedure implemented by an image display system according to an embodiment of the present invention.

FIG. 1 schematically shows an example of image processing procedure implemented by an image display system 100 according to an embodiment of the present invention. The image display system 100 includes an image processing server 10 and an image display terminal 30 that are connected via a network N. The following is a schematic description of a delivery process for delivering an omnidirectional image according to the present embodiment.

(1) A user 2 operating the image display terminal 30 downloads an omnidirectional image in its entirety from the image processing server 10 and displays a region of the omnidirectional image that the user wishes to view (such a region being referred to as "view region" or "display region" hereinafter). In FIG. 1, the user is displaying a view region 5 of the omnidirectional image on the image display terminal 30.

(2) The image display terminal 30 transmits view region information specifying the view region 5 viewed by the user to the image processing server 10.

(3) In the image processing server 10, the omnidirectional image is partitioned into cells in advance. Note that the number indicated at the upper left corner of each cell represents a cell number of the corresponding cell. Each time the view region information is transmitted to the image processing server 10, the image processing server 10 increments a number of views stored with respect to each cell that has been viewed by one. In the omnidirectional image of FIG. 1, the view region 5 includes cells 2, 3, 6, and 7, and as such, the number of views stored with respect to cells 2, 3, 6, and 7 are incremented by one. When the omnidirectional image is viewed by at least a certain number of users 2 (or at least a certain number of times) and view region information is transmitted to image processing server 10 each time, the image processing server 10 may be able to identify cells that are not frequently viewed.

(4) The image processing server 10 retains cells that are viewed more frequently (i.e., cells with a larger number of views) than other cells, and deletes image data of cells that are less frequently viewed (cells with a smaller number of views). In the example of FIG. 1, cells 2-8 are retained and image data of the other cells are deleted. Note that the cells that have been deleted are indicated by diagonal hatching in FIG. 1. Then, the next time the user 2 sends a request for the omnidirectional image, the image processing server 10 only transmits image data of cells 2-8 to the image display terminal 30. In this way, the time required for downloading the omnidirectional image may be reduced without lowering the quality of the omnidirectional image.

<Terms>

In the following, certain terms used in the present description are defined.

"Content" refers to at least one omnidirectional image. Content may also include a map showing the location where the omnidirectional image was captured, for example. Further, when the omnidirectional image is a video image, the content may include a map indicating the image capturing location of the omnidirectional image on a route, for example. Also, the content may include audio data collected at the image capturing location, for example.

"Omnidirectional image" is an image capturing a substantially 360-degree field of view. Note, however, that the omnidirectional image does not necessarily have to be an image capturing a completely 360-degree field of view as long as it captures a substantially 360-degree field of view. That is, the omnidirectional image has an angle of view that is at least wider than that of a normal image. Also, an omnidirectional image includes images captured by a wide-angle lens such as a fisheye lens that have been stitched together. Note that embodiments of the present invention may also be applied to a 180-degree field of view image, for example. That is, an omnidirectional image is one form of a wide-angle image that can be partitioned into a plurality of partitioned regions and partially transmitted, for example.

<Registration of Omnidirectional Image in Image Processing Server>

Still images and video images may be registered in the image processing server 10. In a case where a user registering content in the image processing server 10 (hereinafter referred to as "content registrant 8") is registering a still image, the content registrant 8 may transmit an omnidirectional image captured at a particular location to the image processing server 10. The omnidirectional image has position information attached thereto, and the image processing server 10 may identify the image capturing position of the omnidirectional image based on the position information.

Also, the content registrant 8 may register a video image in the following manner, for example. Note that in the following descriptions, for convenience of explanation, the content registrant 8 and the person capturing an omnidirectional image are assumed to be the same person. However, the content registrant 8 may be different from the person capturing the omnidirectional image.

Figure 2:
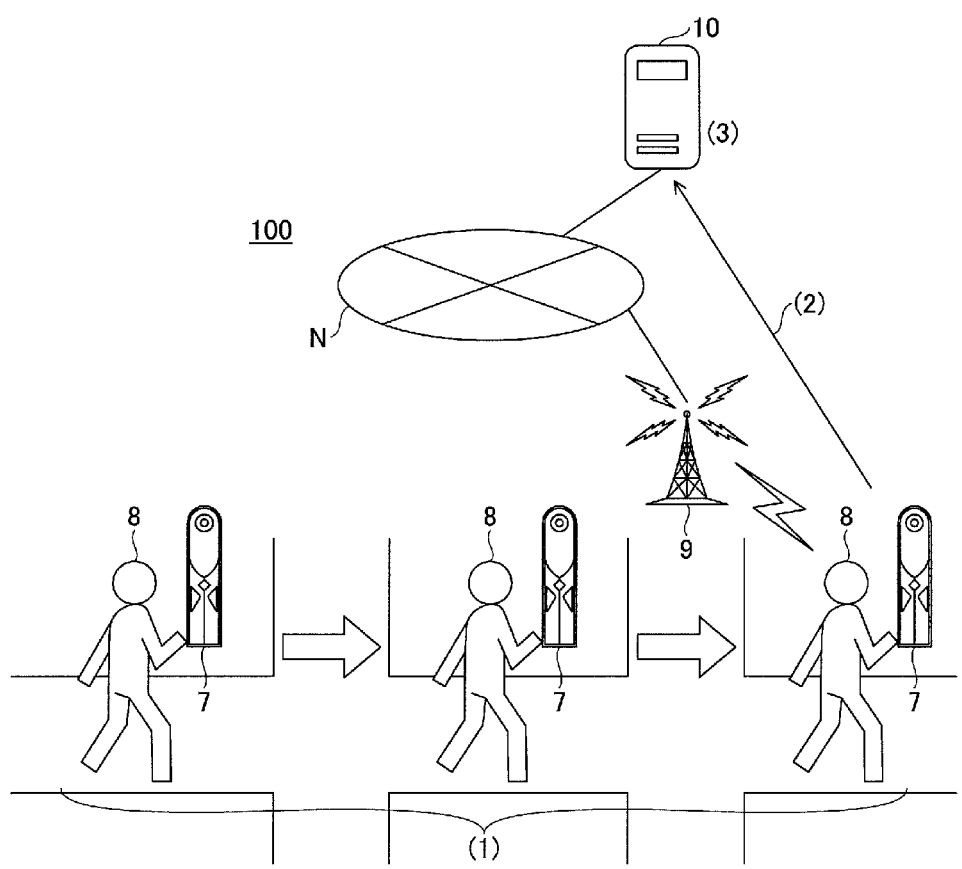
FIG. 2 is a diagram schematically showing an example operation in which a content registrant registers an omnidirectional image.

FIG. 2 is a diagram schematically showing an example operation of the content registrant 8 registering an omnidirectional image.

(1) The content registrant 8 walks while holding an imaging apparatus 7 that is capable of capturing an omnidirectional image. The imaging apparatus 7 may be configured to capture images at regular time intervals or regular distance intervals, for example, and store the captured omnidirectional images in association with the image capturing position. In this way, images captured along a route followed by the content registrant 8 may be obtained. Note that application of the present embodiment is not limited to cases where the content registrant 8 is walking. In other examples, the imaging apparatus 7 may be placed in a vehicle to capture a video image of a driving route or the like.

(2) Once the content registrant 8 reaches a desired destination and the operation of capturing an omnidirectional video image of the route is completed, the content registrant 8 transmits the captured omnidirectional video image to the image processing server 10 via a wireless station apparatus 9, such as a base station or an access point.

(3) The image processing server 10 generates content using a map including the route followed by the content registrant 8 and the omnidirectional video image and stores the generated content. Note that in a case where the imaging apparatus 7 does not have a communication function, a device, such as a smartphone, that has received the omnidirectional video image from the imaging apparatus 7 may transmit the omnidirectional video image to the image processing server 10. Similarly, in a case where the imaging apparatus 7 does not have a position detection function, such as a GPS (Global Positioning System), for acquiring position information of the image capturing position, position information acquired by a GPS receiver of a device, such as a smartphone, may be attached to the omnidirectional video image, for example.

Further, in the example described above in connection with FIG. 2, it is assumed that the imaging apparatus 7 is capable of capturing an omnidirectional image. However, in other examples, a normal imaging apparatus may be used to capture images of rectangular regions. In this case, for example, the content registrant 8 may create an omnidirectional image by stitching together images of a plurality of rectangular regions.

<System Configuration>

Figure 3:
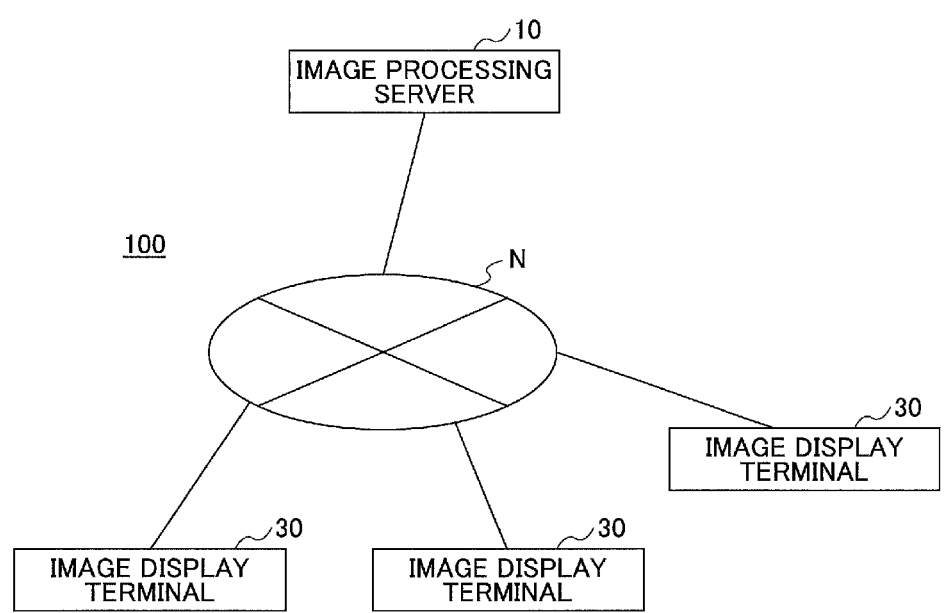
FIG. 3 is a diagram schematically showing an example configuration of the image display system.

FIG. 3 shows an example schematic configuration of the image display system 100 according to the present embodiment. The image display system 100 includes the image processing server 10 and at least one image display terminal 30 that can communicate with each other via a network N.

The network N may be configured by a LAN within a facility of a corporation or the like in which the image display terminal 30 is located, a provider network of a provider connecting the LAN to the Internet, and a telephone line or the like provided by a telecommunications operator, for example. The network N may include the Internet. The network N may be configured by a wired or wireless network, or a combination of wired and wireless networks, for example. Also, note that in a case where the image display terminal 30 is directly connected to a telephone line or a mobile telephone network, the image display terminal 30 may be connected to the provider network without being connected to a LAN.

The image processing server 10 is an information processing apparatus that may perform processes of delivering an omnidirectional image and reducing the data size of the omnidirectional image. Note that in some embodiments, a separate server may be provided for delivering the omnidirectional image, and the image processing server 10 may mainly perform the process of reducing the data size of the omnidirectional image, for example.

The image display terminal 30 is an information processing apparatus used by a user as a terminal apparatus for downloading and viewing an omnidirectional image. More specifically, for example, the image display terminal 30 may be a PC (Personal Computer), a smartphone, a tablet apparatus, a cell phone, a car navigation terminal, a wearable computer (e.g., a head-mounted display, a smart watch), a camera, a digital whiteboard, a projector, a game machine, an MFP (Multifunction Peripheral), or the like.

<<Hardware Configuration>>

Figure 4:
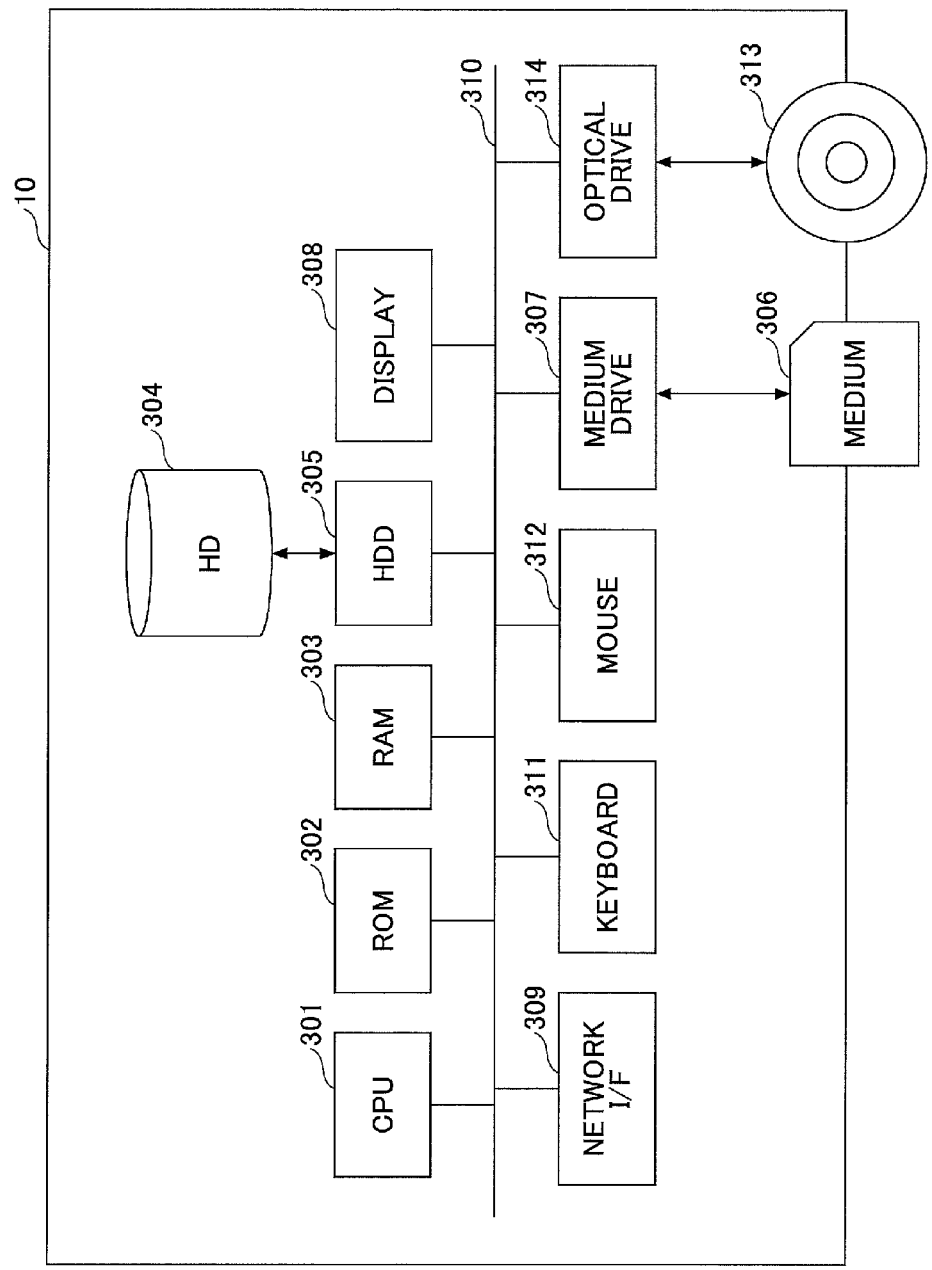
FIG. 4 is a block diagram showing an example hardware configuration of an image processing server.

FIG. 4 shows an example hardware configuration of the image processing server 10. Note that the hardware configuration of the image processing server 10 shown in FIG. 4 does not necessarily have to be provided in a single housing of a single apparatus. In some embodiments, the configuration of the image processing server 10 may be determined by cloud computing to suitably allocate resources based on the load and the like, for example.

In FIG. 4, the image processing server 10 includes a CPU (central processing unit) 301, a ROM (read-only memory) 302, a RAM (random access memory) 303, an HDD (hard disk drive) 305, a display 308, a network I/F (interface) 309, a keyboard 311, a mouse 312, a medium drive 307, and an optical drive 314 that are connected to a bus 310. The CPU 301 executes an image processing program stored in a HD (hard disk) 304, and controls overall operations of the image processing server 10. The ROM 302 stores a program, such as an IPL (Initial Program Reader), used for driving the CPU 301. The RAM 303 is a main storage device used as a working area for the CPU 301. The HD 304 is a storage device including a non-volatile memory.

The HDD 305 controls the reading or writing of various data with respect to the HD 304 under control of the CPU 301. The display (display device) 308 displays various information items, such as a cursor, a menu, a window, text, and/or an image. The network I/F 309 is an interface with the network N.

The keyboard 311 and the mouse 312 are input/output devices. The keyboard 311 includes a plurality of keys for inputting letters, numbers, and/or various instructions, and accepts various inputs via these keys. The mouse 312 accepts selection of a processing object, selection and execution of various instructions, and movement of a mouse pointer, for example.

The medium drive 307 controls the reading or writing (storage) of data with respect to a medium 306, such as a flash memory. The optical drive 314 controls the reading or writing of various data with respect to a removable recording medium, such as a CD (Compact Disc) 313.

Note that the image processing program may be stored as a file in an installable format or an executable format in a computer-readable recording medium, such as the medium 306 or the CD 313, and distributed in such a state, for example. Alternatively, the image processing program may be downloaded from any type of information processing apparatus acting as a server, for example.

Figure 5:
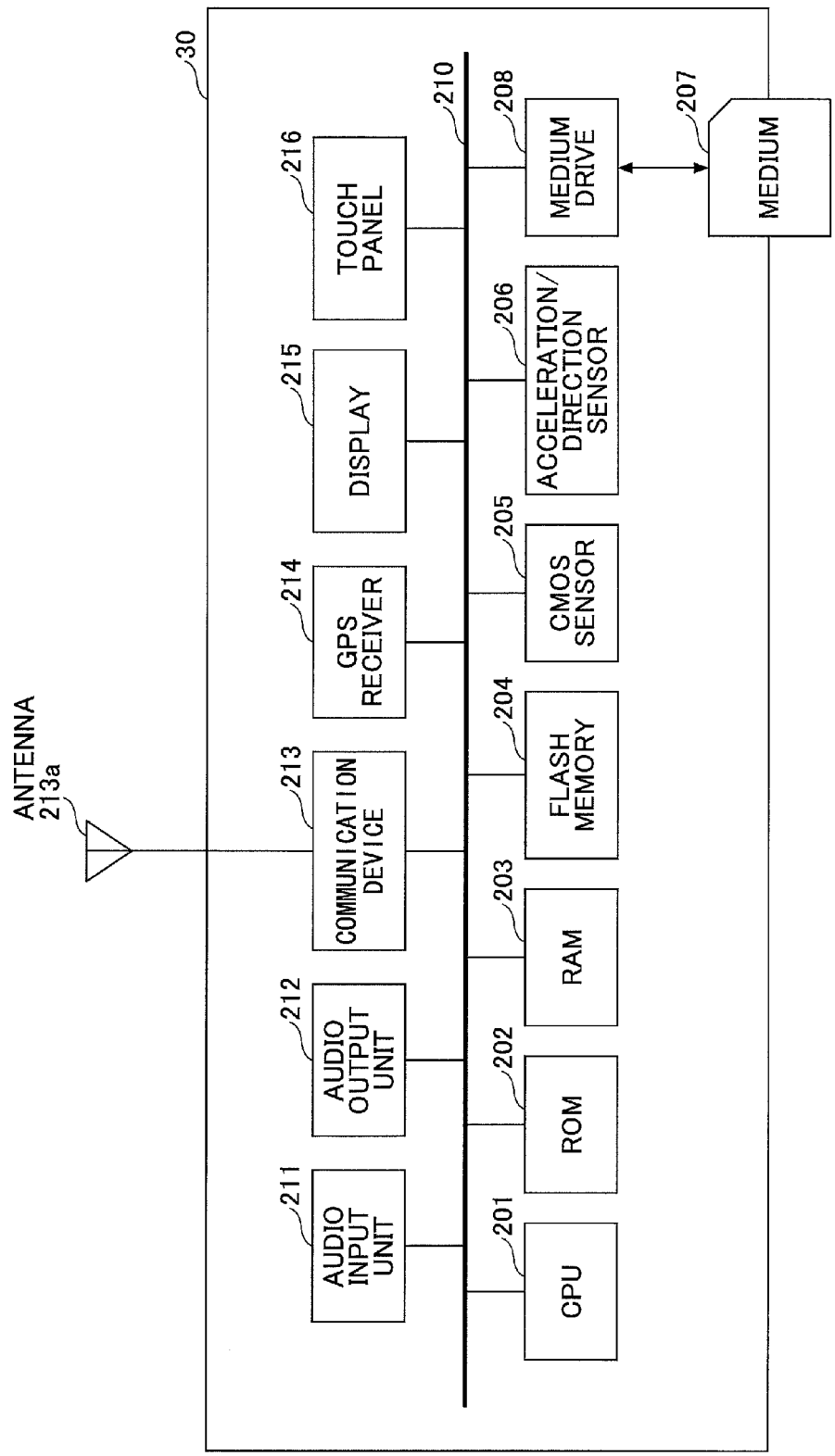
FIG. 5 is a block diagram showing an example hardware configuration of an image display terminal.

FIG. 5 shows an example hardware configuration of the image display terminal 30. Note that although FIG. 5 shows an example where the image display terminal 30 is implemented by a smartphone or a tablet apparatus, the hardware configuration of the image display terminal 30 is not limited to the present example.

In FIG. 5, the image display terminal 30 includes a CPU 201, a ROM 202, a RAM 203, a flash memory 204, a CMOS (complementary metal-oxide semiconductor) sensor 205, an acceleration/direction sensor 206, a medium drive 208, an audio input unit 211, an audio output unit 212, a communication device 213, a GPS receiver 214, a display 215, and a touch panel 216 that are connected to a bus 210. The bus 210 may be an address bus or a data bus for electrically connecting the above units, for example.

The CPU 201 controls the overall operations of the image display terminal 30 by executing a program stored in the flash memory 204. The ROM 202 stores an IPL or a basic input/output program. The RAM 203 is a main storage device uses as a working area by the CPU 201 upon executing a program. The flash memory 204 is a nonvolatile storage device for storing programs to be executed by the image display terminal 30 and various data. For example, the flash memory 204 may store an operating system and a terminal program to be executed by the image display terminal 30.

The CMOS sensor 205 is an imaging element that obtains image data by capturing an image of an object under the control of the CPU 201. Note that in some embodiments, a CCD sensor may be used instead of the CMOS sensor 205. The acceleration/direction sensor 206 may include an electronic magnetic compass function for detecting geomagnetism, a gyro sensor, and an acceleration sensor, for example. The medium drive 208 controls the reading or writing (storage) of data with respect to a recording medium 207, such as a flash memory. The recording medium 207 is a removable storage device from which data recorded thereon may be read (retrieved), or on which new data may be written (stored) under control of the medium drive 208.

The audio input unit 211 is a microphone that converts audio into an audio signal. The audio output unit 212 is a speaker that converts the audio signal into audio. The communication device 213 may use an antenna 213a to exchange wireless communication signals with the nearest wireless station apparatus 9. Alternatively, the communication device 213 may include a LAN card that is connected to a LAN. The GPS receiver 214 detects and computes position information (latitude, longitude, and altitude) of the image display terminal 30 using GPS satellites or IMES (Indoor Messaging System) as an indoor GPS.

The display (display device) 215 displays various images and objects under control of the CPU 201. For example, the display 215 may display an omnidirectional image and/or various menus and icons for enabling the user to operate the image display terminal 30. The touch panel 216 may be integrally superimposed on the display 215 and detects a touch position (coordinates) of a finger or a touch pen on the display 215, for example.

The terminal program may be browser software or application software with a similar function, for example. The terminal program may be stored as a file in an installable format or an executable format in a computer-readable recording medium, such as the recording medium 207, and distributed in such a state, for example. Alternatively, the terminal program may be downloaded from any type of information processing apparatus acting as a server, for example.

<Functional Configuration>

Figure 6:
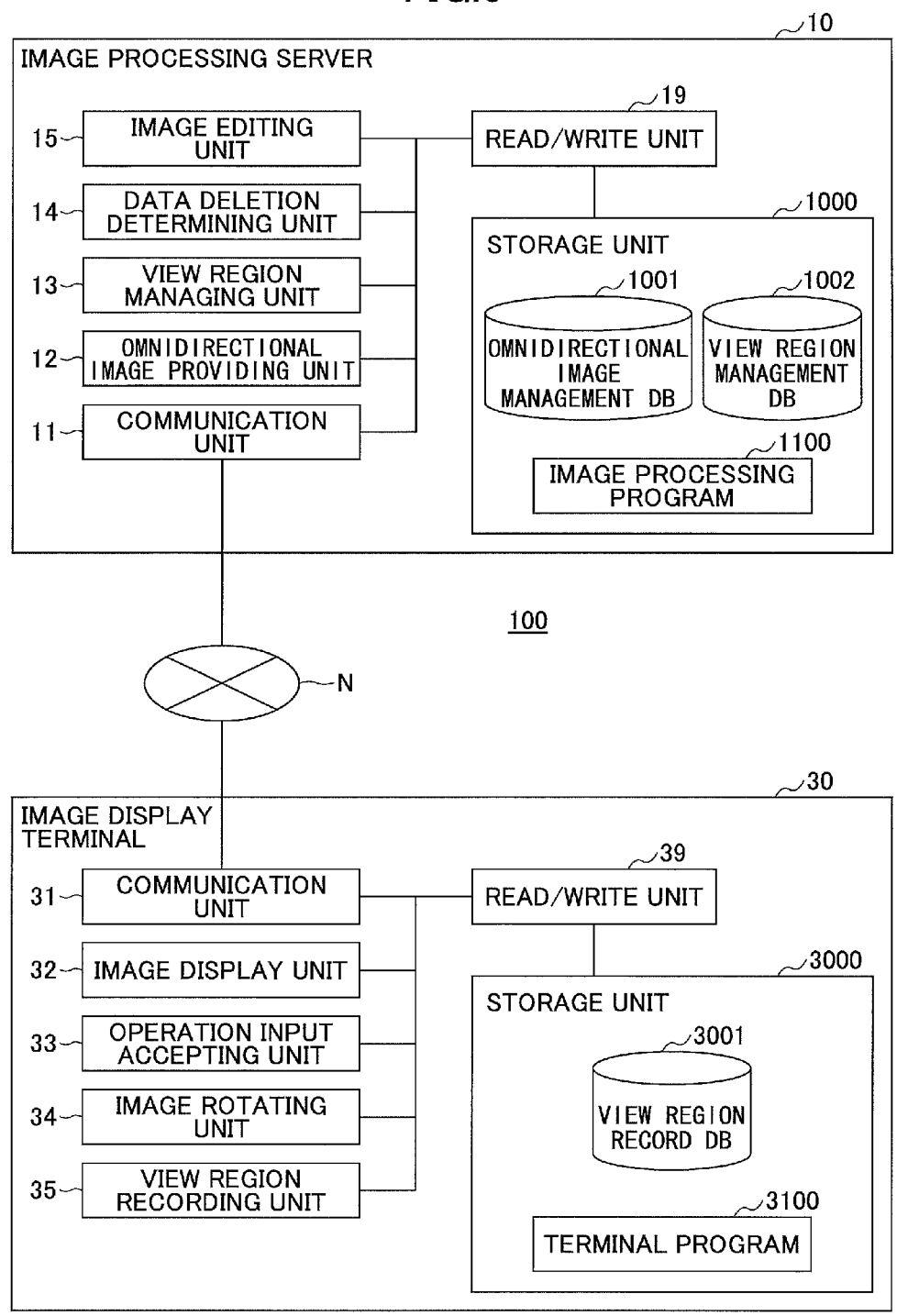
FIG. 6 is a block diagram showing example functional configurations of the image processing server and the image display terminal.

In the following, functional configurations of the image processing server 10 and image display terminal 30 are described with reference to FIG. 6. FIG. 6 is a block diagram showing example functional configurations of the image processing server 10 and the image display terminal 30. Note that in FIG. 6, only one image display terminal 30 is shown for convenience of explanation.

<<Image Processing Server 10>>

The image processing server 10 includes a communication unit 11, an omnidirectional image providing unit 12, a view region managing unit 13, a data deletion determining unit 14, an image editing unit 15, and a red/write unit 19.

Note that the above functional elements of the image processing server 10 may be implemented by one or more of the hardware elements of the image processing server 10 shown in FIG. 4 performing an operation based on a command from the CPU 301 that is executing an image processing program 1100 loaded from the HD 304 into the RAM 303, for example.

The image processing server 10 also includes a storage unit 1000, which may be configured by at least one of the HD 304, the ROM 302, and the RAM 303 of FIG. 4. The storage unit 1000 stores the image processing program 1100. In the following, databases (DB) stored in the storage unit 1000 are described.

TABLE 1

Omnidirectional Image Management Table

| CONTENT ID | CONTENT NAME | URI | POSITION INFORMATION |
|---|---|---|---|
| C001 | CONTENT ABC | ftp://xxx.co.jp/picture/ABC.jpg | (X, Y, Z) |
| C002 | CONTENT DEF | ftp://xxx.co.jp/picture/DEF.jpg | (X, Y, Z) |
| ... | ... | ... | ... |

The storage unit 1000 stores an omnidirectional image management DB 1001 that may be configured by an omnidirectional image management table as shown in the above Table 1, for example. In the omnidirectional image management table represented by Table 1, a content name, a URI (Uniform Resource Identifier), and position information are registered in association with a content ID. The content ID is identification information for uniquely identifying content registered in the image processing server 10. The content name may include characters, symbols, and/or numbers for enabling a user to identify the content. Note that the content name does not necessarily have to be a unique name within the image processing server 10. The URI indicates the storage location where the content is stored or managed. The position information represents the image capturing position of the omnidirectional image included in the content. Note that although the position information is actually described in an image file according to the data format of the image data included in the image file, the position information is shown in Table 1 for convenience of description. Also, note that in the case where the content includes a video image, position information is attached to each frame making up the video image.

TABLE 2

View Region Management Table
CONTENT ID = C001 NUMBER OF VIEWERS = 15

| CELL NUMBER | COORDINATE INFORMATION | NUMBER OF VIEWS |
|---|---|---|
| 1 | (X, Y) (X, Y) | 0 |
| 2 | (X, Y) (X, Y) | 2 |
| 3 | (X, Y) (X, Y) | 1 |
| 4 | (X, Y) (X, Y) | 2 |
| ... | ... | ... |

The storage unit 1000 also stores a view region management DB 1002 that may be configured by a view region management table as shown in the above Table 2, for example. In the view region management table represented by Table 2, for each content ID of content including an omnidirectional image, a cell number, coordinate information, and a number of views are registered in association with each other. Also, the view region management table records the number of viewers that have viewed the content up to the present. The cell number is identification information for identifying each divided region (cell) of the omnidirectional image that is partitioned into multiple cell regions. The coordinate information may specify the cell by coordinates of the upper-left corner of the cell and coordinates of the lower right corner of the cell, for example. The number of views is the number of times the cell has been viewed since the omnidirectional image has become viewable, for example. Note that in some embodiments, the number of times the cell has been viewed in the past predetermined time period (e.g., 1 week, 1 month, or 1 year) may be recorded as the number of views. In this case, the number of viewers will also be the number of viewers that have viewed the content in the past predetermined time period.

The dimensions of the cells are not particularly limited and may be optimally designed based on the application. For example, a cell may be designed to be one-half to one-tenth of VGA (Video Graphics Array: 480×640). Note that when the cells are small, it becomes easier to accurately reflect a view region of a user through the deletion of cells because the adjustable minimum unit is smaller. On the other hand, when the cells are too small, the processing load of the image processing server 10 increases. Thus, the cell may be designed based on the processing capability of the image processing server 10 and the like.

(Image Processing Server Functions)

The communication unit 11 of the image processing server 10 may be implemented by the network I/F 309 and a command from the CPU 301 shown in FIG. 4, for example. The communication unit 11 transmits and receives various types of data to/from the image display terminal 30 via the network N.

The omnidirectional image providing unit 12 provides content stored in the omnidirectional image management DB 1001 to the image display terminal 30. The image display terminal 30 may access a website in response to a user operation, and when the user selects a button or an image on the website, the image display terminal 30 may request content that is linked to the selected button or image by sending an HTTP request to the image processing server 10, for example.

The view region management unit 13 may be implemented by a command from the CPU 301 shown in FIG. 4, for example. The view region management unit 13 obtains view region information from the image display terminal 30, and updates the number of views stored in the view region management table. That is, based on the view region information, the view region management unit 13 determines the cell number of one or more cells constituting a view region of on omnidirectional image that is being viewed by the user, increments the number of views stored in association with the corresponding cell number. Note that the view region information is described in detail below.

The data deletion determining unit 14 may be implemented by a command from the CPU 301 shown in FIG. 4, for example. The data deletion determining unit 14 refers to the view region management table, and determines to delete cells of an omnidirectional image that are not frequently viewed. As described in detail below, as a plurality of users view the same omnidirectional image, certain cells may be viewed more frequently than other cells while certain other cells may be viewed less frequently than other cells such that a discrepancy is created in the number of times the cells are viewed. Thus, the data deletion determining unit 14 may decide to delete a cell that is viewed less frequently than a predetermined threshold.

The image editing unit 15 may be implemented by a command from the CPU 301 shown in FIG. 4, for example. The image editing unit 15 deletes the cell that has been determined by the data deletion determining unit 14 as a cell to be deleted from the omnidirectional image. Note that a duplicate of the original omnidirectional image is created before one or more cells are deleted therefrom, and the original omnidirectional image without any cells deleted is also stored in the image processing server 10.

The read/write unit 19 may be implemented by the HDD 305 and a command from the CPU 301 shown in FIG. 4, for example. The read/write unit 19 stores various data in the storage unit 1000, and reads various data stored in the storage unit 1000.

<<Image Display Terminal 30>>

The image display terminal 30 includes a communication unit 31, an image display unit 32, an operation input accepting unit 33, an image rotating unit 34, a view region recording unit 35, and a read/write unit 39.

Note that the above functional elements of the image display terminal 30 may be implemented by one or more of the hardware elements of the image display terminal 30 shown in FIG. 5 performing an operation based on a command from the CPU 201 that is executing a terminal program 3100 loaded from the flash memory 204 into the RAM 203, for example. Also, one or more of the above functional elements may be implemented by a web page (e.g., HTML data, XML data, and programs writing in JavaScript (registered trademark)) transmitted from the image processing server 10 instead of the terminal program 3100.

The image display terminal 30 also includes a storage unit 3000, which may be configured by at least one of the flash memory 204, the ROM 202, and the RAM 203 of in FIG. 5. The storage unit 3000 stores the terminal program 3100. In the following, various databases configured in the storage unit 3000 are described.

TABLE 3A

View Region Record Table (Still Image)
STILL IMAGE

CONTENT ID = P001

| 1 | (Xs1, Ys1) | (Xe1, Ye1) |
| 2 | (Xs2, Ys2) | (Xe2, Ye2) |
| 3 | (Xs3, Ys3) | (Xe3, Ye3) |

TABLE 3B

View Region Record Table (Video Image)
VIDEO

CONTENT ID = P001

| 1 | (Xs1, Ys1) | (Xe1, Ye1) |
| 2 | (Xs2, Ys2) | (Xe2, Ye2) |
| 3 | (Xs3, Ys3) | (Xe3, Ye3) |

TABLE 3C

View Region Record Table (Video Image)

| | CONTENT ID = P001 FRAME N | |
|---|---|---|
| 1 | (Xs1, Ys1) | (Xe1, Ye1) |

| | CONTENT ID = P001 FRAME 2 | |
|---|---|---|

| | CONTENT ID = P001 FRAME 1 | |
|---|---|---|
| 1 | (Xs1, Ys1) | (Xe1, Ye1) |
| 2 | (Xs2, Ys2) | (Xe2, Ye2) |
| 3 | (Xs3, Ys3) | (Xe3, Ye3) |

The storage unit 3000 stores a view region record DB 3001 that may be configured by view region record tables as shown in Tables 3A-3C, for example. Table 3A shows an example of a view region record table for content including an omnidirectional image that is a still image. The content ID shown in Table 3A corresponds to the content ID of content including the omnidirectional image that is currently being displayed by the image display terminal 30. Also, two sets of coordinates (e.g., coordinates of upper left corner and lower right corner of view region) specifying the view region viewed by the user are recorded in Table 3A. Note that although three view regions are recorded in Table 3A, a view region record table may have no view regions recorded therein or have two, four, or more view regions recorded therein. Also, in the present example, the two sets of coordinates specifying the view region correspond to view region information (display region information). Note, however, that the view region information may be any information that can specify a particular region. Thus, for example, the view region information may include coordinates of the center of a view region and the number of pixels included therein, or the view region information may be the image of the view region itself.

Tables 3B and Table 3C show examples of view region record tables for content including an omnidirectional image that is a video image. In the case where the content includes an omnidirectional video image, one of two different methods may be used to record view regions of the content (hereinafter referred to as "continuous recording method" and "frame-by-frame recording method"). The continuous recording method is similar to the method for recording the view region of a still image and involves recording a region that is displayed (viewed) at least once while the video image is played (Table 3B). That is, one view region record table is created for the video image regardless of the number of frames included in the video image. The frame-by-frame recording method involves recording a view region that has been displayed (viewed) with respect to each frame making up the video image (Table 3C). That is, Table 3C includes multiple view region record tables having frame numbers assigned thereto such that a view region that has been displayed (viewed) may be recorded with respect to each frame.

(Image Display Terminal Functions)

The communication unit 31 of the image display terminal 30 may be implemented by the communication device 213 and a command from the CPU 201 shown in FIG. 5, for example. The communication unit 31 transmits and receives various types of data to/from the image processing server 10 via the network N.

The image display unit 32 may be implemented by a command from the CPU 201 shown in FIG. 5, for example. The image display unit 32 displays an omnidirectional image included in content that has been downloaded from the image processing server 10 on the display 215.

The operation input accepting unit 33 may be implemented by the touch panel 216 and a command from the CPU 201 shown in FIG. 5, for example. The operation input accepting unit 33 accepts various user operations input to the image display terminal 30 by the user. For example, the operation input accepting unit 33 may accept from the user an operation for changing a view region of an omnidirectional image. Also, if an omnidirectional video image is being viewed by the user, the operation input accepting unit 33 may also accept operations for freezing (pausing), playing, and/or selecting a frame (image capturing position) in addition to an operation for changing the view region, for example.

The image rotating unit 34 may be implemented by a command from the CPU 201 shown in FIG. 5, for example. The image rotating unit 34 rotates an omnidirectional image displayed by the display 215 in response to a user operation and displays a view region of the omnidirectional image selected by the user on the display 215.

The view region recording unit 35 may be implemented by a command from the CPU 201 shown in FIG. 5, for example. In the case of a still image, after a predetermined time period elapses from the time the image rotating unit 34 finishes rotating an omnidirectional image, the view region recording unit 35 may register coordinates of the view region that is currently displayed on the display 215 in the view region record DB 3001, for example. Note that the view region does not necessarily have to exactly match the region displayed on the display 215. That is, margins may be provided such that the view region may be slightly enlarged or reduced as desired, for example.

In the case where a video image is displayed (viewed) and the continuous recording method is implemented, coordinates of a view region is recorded each time the image rotating unit 34 changes the view region. Note that in this case, as with the case of recording the view region of a still image, the view region may be recorded after a predetermined time period elapses from the time the image rotating unit 34 finishes rotating the omnidirectional image. In the case where the frame-by-frame recording method is implemented for recording a view region of a video image, coordinates of the view region displayed on the display 215 is recorded each time a frame is switched to another frame. Note that the view region recording unit 35 sends the coordinates specifying the view region recorded in the view region record table to the image processing server 10.

The read/write unit 39 may be implemented by the flash memory 204 and a command from the CPU 201 shown in FIG. 5, for example. The read/write unit 39 stores various types of data in the storage unit 3000 and reads (retrieves) data stored in the storage unit 3000.

<Operation Procedure>

Figure 7:
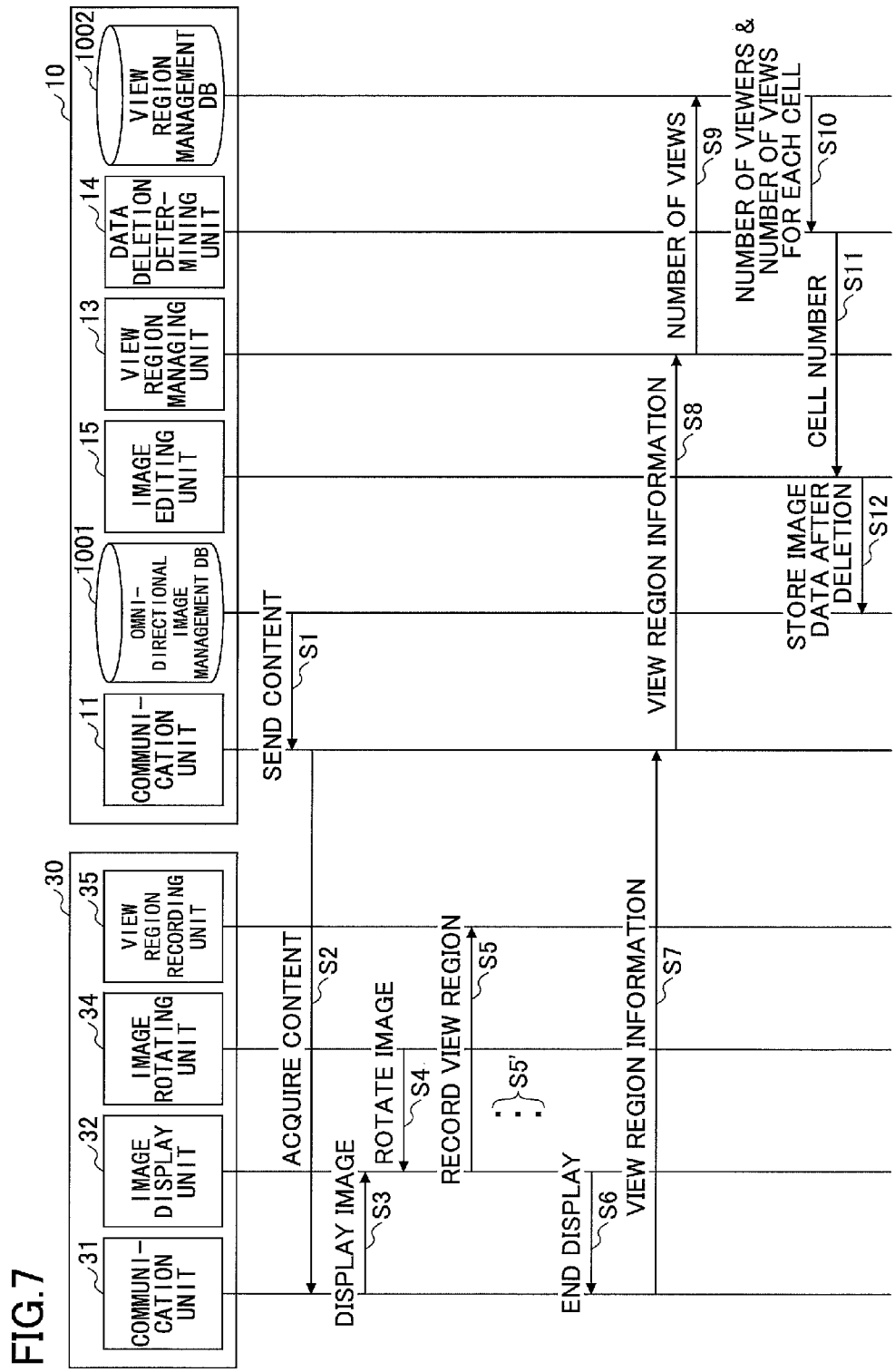
FIG. 7 is a sequence chart showing an example operation procedure of the image display system.

FIG. 7 is a sequence chart showing an example operation procedure of the image display system 100. The operation of FIG. 7 is started by the image display terminal 30 sending a request for content to the image processing server 10.

In step S1, the read/write unit 19 of the image processing server 10 reads (retrieves) the requested content from the omnidirectional image management DB 1001 and sends the content to the communication unit 11.

In step S2, the communication unit 11 of the image processing server 10 transmits the content to the communication unit 31 of the image display terminal 30. In this way, the image display terminal 30 acquires the content.

In step S3, the communication unit 31 of the image display terminal 30 that has received the content sends the content to the image display unit 32. In this way, the image display unit 32 displays the omnidirectional image included in the content on the display 215.

In step S4, the user rotates the omnidirectional image by operating the image display terminal 30 to display a desired view region on the display 215. In turn, the image rotating unit 34 rotates the omnidirectional image displayed on the display 215.

In step S5, while the omnidirectional image is displayed on the display 215, the view region recording unit 35 monitors whether at least a predetermined time period (e.g., 3 seconds) has elapsed from the time the image rotating unit 34 has rotated the omnidirectional image. That is, the view region recording unit 35 determines whether the view region has been continuously displayed on the display 215 for at least a predetermined time period. Upon determining that the view region has been continuously displayed for at least the predetermined time period, the view region recording unit 35 records the view region in the view region record DB 3001. Note that the process of step S5 is repeatedly performed while the user is viewing the content (S5').

In step S6, when the user ends displaying the omnidirectional image, closes the browser, or explicitly inputs an operation to the image display terminal 30 to stop viewing the omnidirectional image, the image display unit 32 (or the operation input accepting unit 33) sends a display end signal to the communication unit 31.

In step S7, the communication unit 31 transmits the view region information that has been read (retrieved) from the view region record DB 3001 to the image processing server 10.

In step S8, the communication unit 11 of the image processing server 10 receives the view region information and sends the view region information to the view region managing unit 13.

In step S9, the view region managing unit 13 converts the view region information specifying the view region into one or more cell numbers of one or more cells constituting the view region, and increments the number of views stored in association with the corresponding cell numbers in the view region management DB 1002 by one. Also, the number of viewers for the content that is recorded in the view region management DB 1002 is incremented by one. Note that in a case where information on the number of viewers is transmitted from the image display terminal 30, for example, the corresponding number may be added to the number of viewers recorded in the view region management DB 1002, for example.

In step S10, the data deletion determining unit 14 reads (retrieves) the number of views for each cell number and the number of viewers from the view region management DB 1002 to determine a cell to be deleted. Note that the process of determining the cell to be deleted is described in detail below with reference to FIGS. 8A-9B.

In step S11, the data deletion determining unit 14 sends the cell number of the cell determined to be deleted to the image editing unit 15.

In step S12, the image editing unit 15 deletes the cell to be deleted from the omnidirectional image and stores the resulting edited omnidirectional image (reduced omnidirectional image) in the omnidirectional image management DB 1001.

As described above, each time a user views an omnidirectional image, the image processing server 10 may determine a cell to be deleted and delete such cell from the omnidirectional image such that the image processing server 10 may only transmit regions of the omnidirectional image that are frequently viewed. In this way, the waiting time required for a user to download the omnidirectional image may be reduced. Note that the deletion timing for deleting a cell from an omnidirectional image does not necessarily have to be every time a user views the omnidirectional image or every time the image processing server 10 receives view region information. For example, the deletion may be performed after a certain number of users have viewed the omnidirectional image, at fixed time intervals such as once a day, or in response to an external process request.

<<Determination of Cell to be Deleted>>

(Deletion Determination Based on Ratio of Number of Views to Number of Viewers)

In the following, the process of determining a cell to be deleted that is performed in step S10 of FIG. 7 by the data deletion determining unit 14 is described with reference to FIG. 8A. Note that although the process for determining a cell to be deleted may be substantially the same for both a still image and a video image, for convenience of explanation, the determination process performed with respect to a still image is first described below.

FIG. 8A is a table schematically showing the number of times each cell of an omnidirectional image has been viewed. In FIG. 8A, the cells are assigned integers increasing in value by one from the upper left corner cell to the lower right corner cell. These integers correspond to the cell numbers of the cells. Also, the numbers in parentheses indicated next to the cell numbers of the cells correspond to the number of times the cells have been viewed (number of views). Note that FIG. 8A corresponds to a view region management table represented in a different manner from the above Table 2.

Figure 9B:
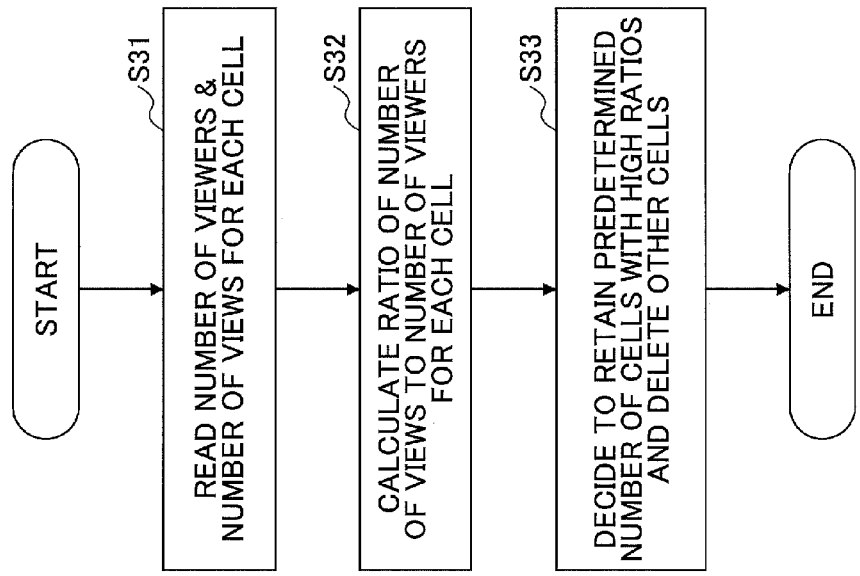
FIGS. 9A and 9B are flowcharts showing example procedures implemented by a data deletion determining unit for determining a cell to be deleted.
Figure 9A:
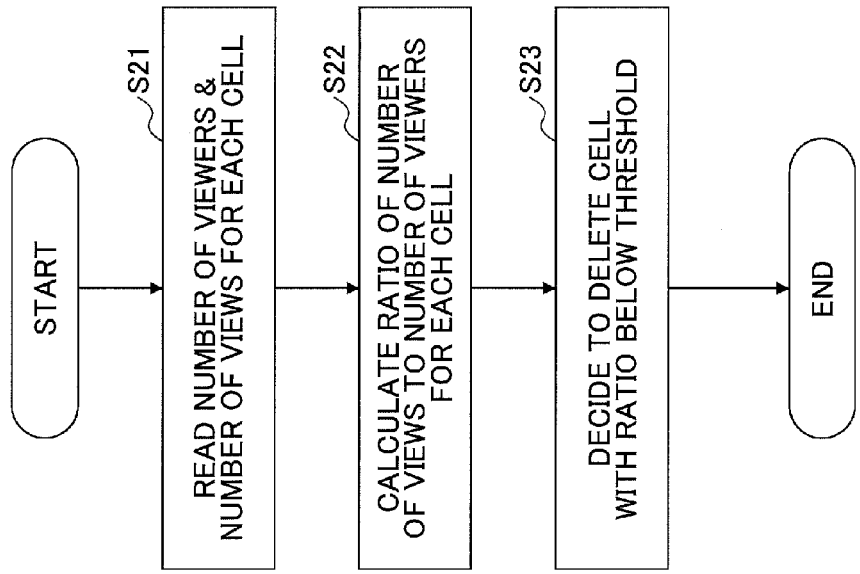

FIG. 9A is a flowchart showing an example procedure implemented by the data deletion determining unit 14 for determining a cell to be deleted.

In step S21, the data deletion determining unit 14 reads (retrieves) the number of viewers and the number of views for each cell from the view region management DB 1002.

Then, in step S22, the data deletion determining unit 14 calculates the ratio of the number of views to the number of viewers for each cell. Note that because the number of viewers will be incremented by one each time view region information is received from the image display terminal 30, the above ratio may also be calculated based on the number of views for each cell and the number of times view region information has been received (number of receptions of the view region information).

Then, in step S23, the data deletion determining unit 14 decides to delete a cell with the above calculated ratio falling below a threshold. The threshold may be a predetermined value that is set up in advance. For example, in a case where the threshold is set to 50%, because the number of viewers is 15 in FIG. 8A, the data deletion determining unit 14 may decide to delete cells with a number of views less than or equal to 7. In this case, cells other than those with the cell numbers 13-24 may be deleted as shown in FIG. 8B.

Note that in the above deletion method, the number of cells deleted is not fixed but varies depending on the set threshold and the viewing tendency of viewers. In other words, a large number of cells may be deleted if the threshold is set high or a large discrepancy exists between cells that are often viewed and cells that are not often viewed. On the other hand, a large number of cells may remain if the threshold is set low or if the discrepancy in the number of views for each cell is relatively small.

Note that the threshold does not have to be fixed and may be set by the content registrant, for example. Also, regions corresponding to the sky or the ground may be detected by relevant image processes and the threshold may be changed based on the area of the detected regions, for example.

Also, in some embodiments, the content registrant or the like may designate a cell that is not to be deleted in advance. For example, a region of an omnidirectional image transmitted from the image processing server 10 that is to be initially displayed on the display 215 by the user is predetermined. Therefore, a cell including at least a portion of such a region is preferably not deleted. Accordingly, such a cell may be registered in the view region management DB 1002 as a cell that cannot be deleted, for example. Also, a cell capturing an image of important information may be registered as a cell that cannot be deleted. Further, in some embodiments, the view region recording unit 35 may be configured to record a view region initially displayed on the display 215 regardless of whether such view region continues to be displayed, and in this way, one or more cells representing the view region initially displayed may be prevented from being deleted.

In the following, the process of determining a cell to be deleted when the omnidirectional image is a video image is described. In the case where the view regions of the video image have been recorded using the continuous recording method, the process for determining a cell to be deleted may be substantially similar to that performed with respect to a still image. Note that in this case, the data deletion determining unit 14 determines a cell to be deleted and the image editing unit 15 of the image processing server 10 deletes the cell to be deleted from all frames constituting the omnidirectional image. The above method may be suitably implemented in a case where changes in the video image are relatively minor such that most users are not likely to change the view region. In this way, the processing load of the image display terminal 30 upon deleting a cell may be reduced.

The process for determining a cell to be deleted may be substantially similar to that performed with respect to a still image also in the case where the view regions of the video image have been recorded using the frame-by-frame recording method. However, in this case, the data deletion determining unit 14 determines a cell to be deleted with respect to each frame constituting the omnidirectional image. Then, the image editing unit 15 of the image processing server 10 deletes the cell to be deleted with respect to each frame constituting the omnidirectional image. Note that if the video image includes substantial changes, the view regions viewed by a plurality of users may vary on a frame-by-frame basis, for example. Thus, the above method may provide users with an omnidirectional video image with cells suitably deleted on a frame-by-frame basis.

(Retention of Fixed Number of Cells and Deletion of Other Cells)

In some embodiments, the data deletion determining unit 14 may determine a fixed number of cells to be deleted by implementing the procedure as shown in FIG. 9B, for example. Note that the processes of steps S31 and S32 of FIG. 9B are respectively identical to steps S21 and S22 of FIG. 9A. However, the process of step S33 of FIG. 9B varies from step S23 of FIG. 9A as described below.

In the example of FIG. 9B, a number of cells to be deleted is predetermined in the data deletion determining unit 14. For example, the data deletion determining unit 14 may be set up to reduce the number of cells to half the total number of cells. In this case, in step S33, the data deletion determining unit 14 may decide to retain half the cells with ratios in the upper half range (e.g., 15 cells out of 30 cells in the example of FIG. 8A) and decide to delete the other half of the cells. Note that in the above example, the cells to be deleted may also be determined without calculating the above ratio for each cell. That is, the same result may be obtained by determining and retaining half of the cells with a number of views in the upper half range.

In the case where half the total number of cells are to be deleted from the omnidirectional image of FIG. 8A, for example, the data deletion determining unit 14 may decide to retain cells with cell numbers 13-24, 11, 27, and 28 and decide to delete the other cells as shown in FIG. 8C. As can be appreciated, in the example of FIG. 9B, the number of cells to be deleted is predetermined, and as such, a fixed number of cells may always be retained. Also, by setting the number of cells to be deleted to a relatively large number, the time required for the image processing server 10 to transmit an omnidirectional image to the image display terminal 30 may be reduced. Also, by setting the number of cells to be deleted to a relatively small number, the image processing server 10 may be able to transmit an omnidirectional image including a greater number of cells that are likely to be viewed by a user to the image display terminal 30.

(Deletion Based on Content Attribute)

Also, in some embodiments, if the content registrant 8 registers an attribute of content in the view region management table, the threshold or the number of cells to be deleted may be adjusted based on the attribute. An example of a content attribute includes whether the content corresponds to an image captured outdoors or whether the content corresponds to an image captured indoors. Oftentimes, image regions representing the sky and the road surface take up large part of an omnidirectional image captured outdoors, and such image regions of the sky and the road surface are less likely to be viewed. Accordingly, the threshold (to be used to delete cells falling below the threshold) may be set relatively high, or the number of cells to be deleted may be set to a relatively large number in the case of deleting cells from an omnidirectional image that has been captured outdoors, for example.

On the other hand, with respect to an omnidirectional image captured indoors, such as the interior of an apartment, for example, some users may wish to view the structure of a room or the scenery from a window, and some users may wish to view the shape and color of the ceiling or the floor. Accordingly, the threshold (to be used to delete cells falling below the threshold) may be set relatively low, or the number of cells to be deleted may be set to a relatively small number in the case of deleting cells from an omnidirectional image that has been captured indoors, for example.

In this way, the data deletion determining unit 14 may control and adjust the number of cells to be deleted depending on the type of scene captured in the omnidirectional image. Also, in some embodiments, the content registrant 8 may set the threshold or the number of cells to be deleted with respect to each piece of content registered in the view region management table. Because the content registrant 8 can predict which cells of an omnidirectional image are likely to be viewed, the content registrant 8 may set up a suitable threshold or a suitable number of cells to be deleted for each omnidirectional image, for example.

(Deletion Based on Bandwidth)

Also, in some embodiments, the data deletion determining unit 14 may determine the threshold or the number of cells to be deleted based on the bandwidth between the image processing server 10 and the image display terminal 30. That is, if adequate bandwidth is secured between the image processing server 10 and the image display terminal 30, the image processing server 10 may be able to transmit a large number of cells with little delay. Thus, in such case, the threshold may be set relatively low, or the number of cells to be deleted may be set to a relatively small number, for example. On the other hand, if the bandwidth between the image processing server 10 and the image display terminal 30 is inadequate, the image processing server 10 should be set up to transmit a fewer number of cells. Thus, in such case, the threshold may be set higher or the number of cells to be deleted may be set to a larger number, for example. Note that the bandwidth between the image processing server 10 and the image display terminal 30 may be measured by having the image processing server 10 transmit a predetermined amount of data, for example. Also, in some embodiments, the data deletion determining unit 14 may be configured to acquire network information (e.g., information on whether the image display terminal 30 is using a mobile network or a wired LAN) from the image display terminal 30, for example. The data deletion determining unit 14 may use such network information in a manner similar to the bandwidth information. That is, the data deletion determining unit 14 may adjust the threshold or the number of cells to be deleted based on the type of network used by the image display terminal 30, for example.

Note that in the examples shown in FIGS. 8A-8C, the number of views for a cell is arranged to be incremented each time the cell is viewed. However, in other examples, the number of times a cell has been excluded (not viewed) may be incremented each time the cell is not included in a view region of content, for example. In this case, the image processing server 10 may calculate the ratio of the number of times a cell has been excluded (not viewed) to the number of viewers of the content and delete the cell if the calculated ratio is greater than or equal to a threshold, for example. Also, in the case of retaining a fixed number of cells, the data deletion determining unit 14 may determine the fixed number of cells that have been excluded the least number of times and decide to retain these cells, for example.

<Viewing Content with Cells Deleted>

Figure 10:
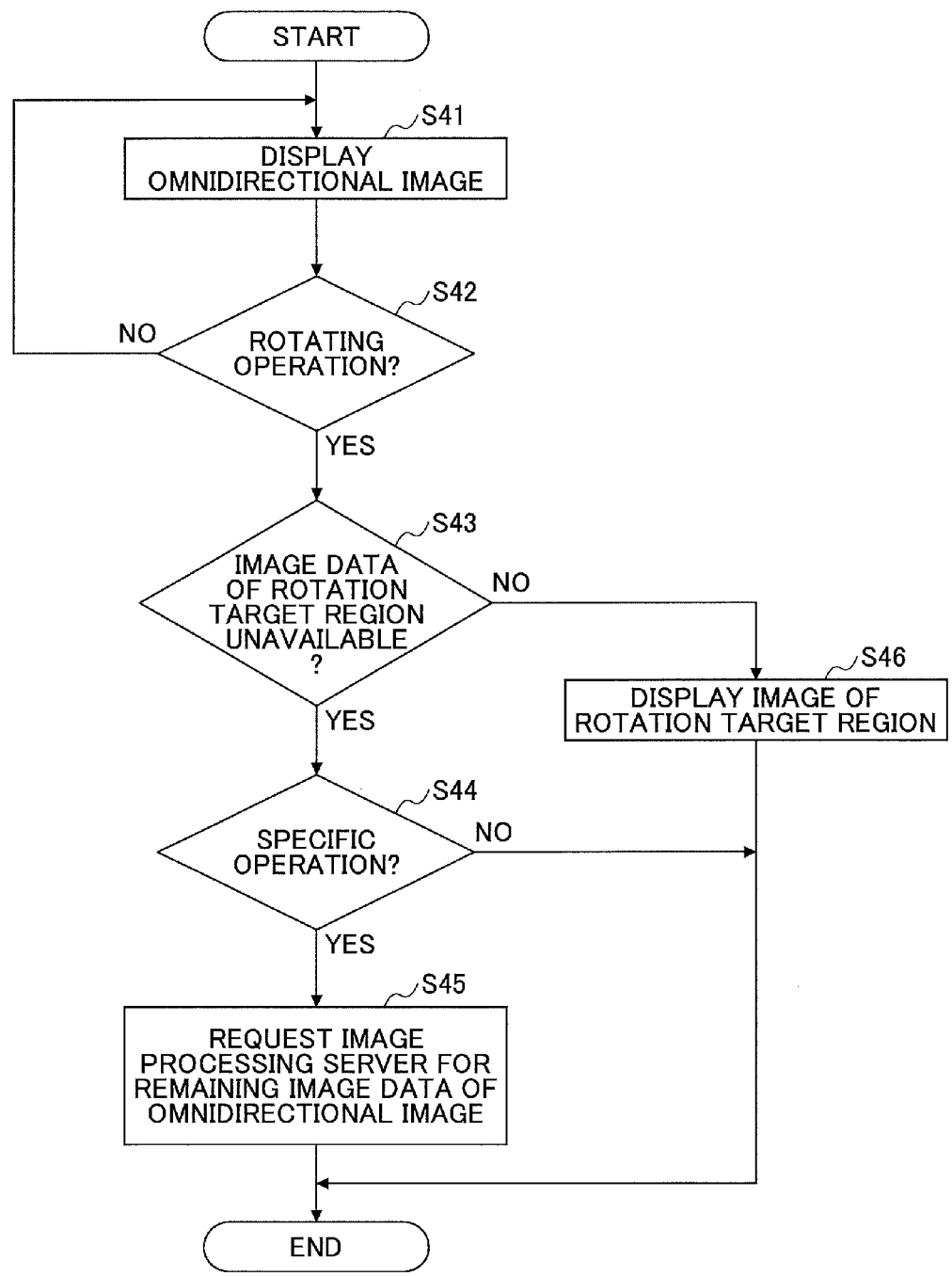
FIG. 10 is a flowchart showing an example procedure implemented by the image display terminal for displaying content with cells deleted.

FIG. 10 is a flowchart showing an example procedure implemented by the image display terminal 30 for displaying content with one or more cells deleted (content that has undergone the cell deletion process). The process of FIG. 10 may be started when the image display terminal 30 receives content to be displayed. Note that the image display terminal 30 may receive the content through processes similar to steps S1 and S2 of FIG. 7, for example.

(Still Image)

In the following, for convenience of explanation, a process of displaying an omnidirectional image that is a still image is first described.

When the communication unit 31 of the image display terminal 30 receives content, the image display unit 32 displays an omnidirectional image included in the content on the display 215 (step S41).

Next, the operation input accepting unit 33 determines whether an image rotating operation for rotating the image (changing the current view region) has been input (step S42). If no image rotating operation has been input (NO in step S42), the display of the omnidirectional image is continued as is.

If an image rotating operation has been input (YES in S42), the image display unit 32 determines whether image data of a rotation target region of the omnidirectional image is available (step S43). Because the image display unit 32 can identify the rotation target region to be displayed (i.e., view region to be displayed on the display 215 in response to the image rotating operation), the image display unit 32 can determine whether all the image data of the rotation target region is included in the omnidirectional image received from the image processing server 10.

If it is determined that the image data of the rotation target region is available (NO in step S43), the image display unit 32 displays the corresponding image data of the rotation target region that has been retrieved from the storage unit 3000 on the display 215 (step S46).

If it is determined that the image data of the rotation target region is unavailable (YES in step S43), the operation input accepting unit 33 determines whether the user has performed a specific operation (step S44). The specific operation refers to a user input operation specifically indicating the user's desire to view one or more cells that have been deleted. Note that the user may know the specific operation to be performed beforehand or the specific operation to be performed may be indicated on the display 215 in a manner that would not interfere with the display (viewing) of the omnidirectional image. For example, the specific operation may involve performing the image rotating operation at least a certain number of times within a certain period of time (e.g., 3 or more times within one second).

If the specific operation has been performed by the user (YES in step S44), the image display unit 32 sends a request for the remaining image data of the omnidirectional image to the image processing server 10 (step S45). That is, the image display unit 32 requests the image processing server 10 to send the cells that have been deleted from the omnidirectional image. Note that in some cases, only cells that the user is attempting to view may be requested from among the deleted cells, and in other cases, all of the cells that have been deleted may be requested. In either case, the image processing server 10 transmits image data and information on the region the user is attempting to view. In this way, the image display terminal 30 can promptly display the region of the omnidirectional image to be viewed by the user. Because the image processing server 10 can unambiguously identify the cells that have been deleted, the image processing server 10 may retrieve the deleted cells from the original omnidirectional image (the entire omnidirectional image without any cells deleted) stored in the image processing server 10 and transmit the retrieved deleted cells to the image display terminal 30. Then, the image display unit 32 combines the cells received from the image processing server 10 with the omnidirectional image that has already been received beforehand to reconstruct a single omnidirectional image and displays the image of the region designated by the user as the desired view region through the specific operation on the display 215. Note that in some embodiments, the image display unit 32 may request the image processing server 10 to send the entire omnidirectional image.

In this way, even when the image display terminal 30 receives an omnidirectional image with one or more cells deleted therefrom, the user may still be able to display any region of the omnidirectional image on the display 215.

Also, note that the view region that has been displayed on the display 215 to be viewed by the user is transmitted to the image processing server 10 as view region information. In this way, the number of views recorded in the view region management table may be updated, and cells to be newly deleted may be determined by the cell deletion determination process as described above, for example.

(Video Image)

In the following, a process of displaying an omnidirectional image that is a video image is described. Such a process is similar to the process of displaying a still image in that the image display terminal 30 detects a specific operation (e.g., the user performing an image rotating operation at least a certain number of times within a certain period of time) as a display request for one or more cells that have been deleted. Note that in the case where the continuous recording method is used to record the view regions of the omnidirectional video image, the same cells are deleted with respect to each frame constituting the omnidirectional video image, and as such, the process of detecting the specific operation may be substantially similar to that performed with respect to a still image.

On the other hand, in the case where the frame-by-frame recording method is used to record the view regions of the omnidirectional video image, the cells that are deleted may vary depending on each frame. Thus, for example, by the time the specific operation (e.g., performing a certain number of image rotating operations within a certain time period) is detected, the image display terminal 30 may already be playing (displaying) a next frame of the video image. Accordingly, in this case, for example, the image display unit 32 may determine whether image data of the rotation target region is available based on the frame displayed at the time the first image rotating operation has been detected in step S42. In this way, the image data being requested (corresponding to the region the user is attempting to view) may be accurately determined. Also, in some embodiments, the past several frames that have been displayed may be identified based on the frame displayed at the time the specific operation has been detected (e.g., after image rotating operations have been performed a certain number of times within a certain time period), and the image display unit 32 may determine whether image data of the rotation target region is unavailable for even one of the several frames. If the image data is unavailable for even one of the identified frames, the image display unit 32 may be arranged to receive cells that have been deleted from the image processing server 10. Such an arrangement may be desirable with respect to displaying a video image. That is, because video playback involves successively displaying frames one after another, if image data of a rotation target region is unavailable for even one frame out of several frames, the viewing experience of the user is likely to be compromised.

Note that regardless of whether the continuous recording method or the frame-by-frame recording method is used, the image display terminal 30 may be arranged to request the image processing server 10 to send omnidirectional image frames (only the cells that have been deleted or the entire omnidirectional image frames without any cells deleted) coming after a frame that is currently being displayed, for example. In this way, the user may be able to view an omnidirectional video image in substantially the same manner as the case of viewing an omnidirectional still image.

As described above, in the image display system 100 according to the present embodiment, cells that are less likely to be viewed are deleted based on statistical information on view regions (display regions) displayed by a plurality of users. In this way, a portion of an omnidirectional image that is likely to be viewed by a user can be transmitted to the image display terminal 30. Accordingly, the transmission time for transmitting the omnidirectional image may be reduced and the user may be less likely to feel that downloading the omnidirectional image takes too long.

[Second Embodiment]

In the following, the image display system 100 according to a second embodiment of the present invention is described. In the image processing system 100 according to the second embodiment, when content includes an omnidirectional video image, the data size of the omnidirectional video image is reduced by deleting image regions corresponding to the sky and the ground such that the download time of the omnidirectional video image may be reduced.

Figure 11:
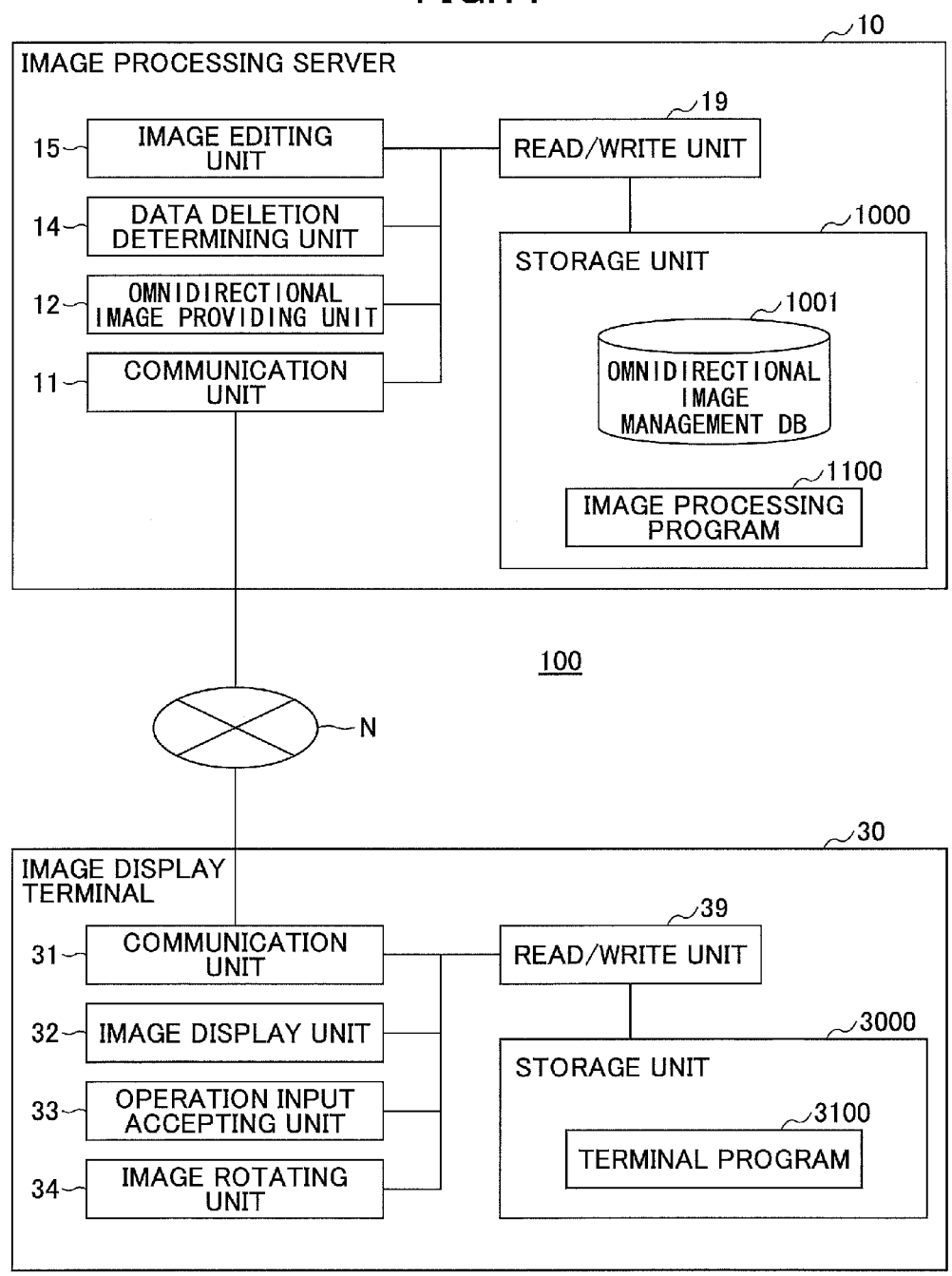
FIG. 11 is a block diagram showing example functional configurations of the image processing server and the image display terminal according to another embodiment of the present invention.

FIG. 11 is a block diagram showing example functional configurations of the image processing server 10 and the image display terminal 30 of the image display system 100 according to the present embodiment. Note that features and elements shown in FIG. 11 that are substantially identical to those shown in FIG. 6 are given the same reference numerals and descriptions thereof may be omitted. The following descriptions mainly relate to features of the present embodiment that differ from the above-described first embodiment.

In the present embodiment, the image processing server 10 does not record the view regions of an omnidirectional image that have been viewed by a plurality of users. Thus, the image processing server 10 and the image display terminal 30 according to the present embodiment do not have to include functions related to recording the view regions. Further, the data deletion determining unit 14 according to the present embodiment has functional features that differ from those of the first embodiment.

<Data Deletion Determination>

The data deletion determining unit 14 according to the present embodiment identifies, from among the omnidirectional images stored in the omnidirectional image management DB 1001, a video image captured by the content registrant 8 while moving in a moving direction. In the case where the omnidirectional image corresponds to a video image captured while moving, regions of the image representing the sky and the ground are less likely to be of interest to a viewer, and therefore, image regions corresponding to the sky and the ground (hereinafter referred to as "sky region" and "ground region") are deleted in the present embodiment. Note that a video image captured while moving may be detected by tracking the position information (e.g., latitude and longitude) of frames constituting a video image according to the order of the frames. That is, if the position information indicates that the image capturing position of the video image is gradually moving in a linear or curved line, the video image may be identified as that captured while moving, for example.

Figure 12:
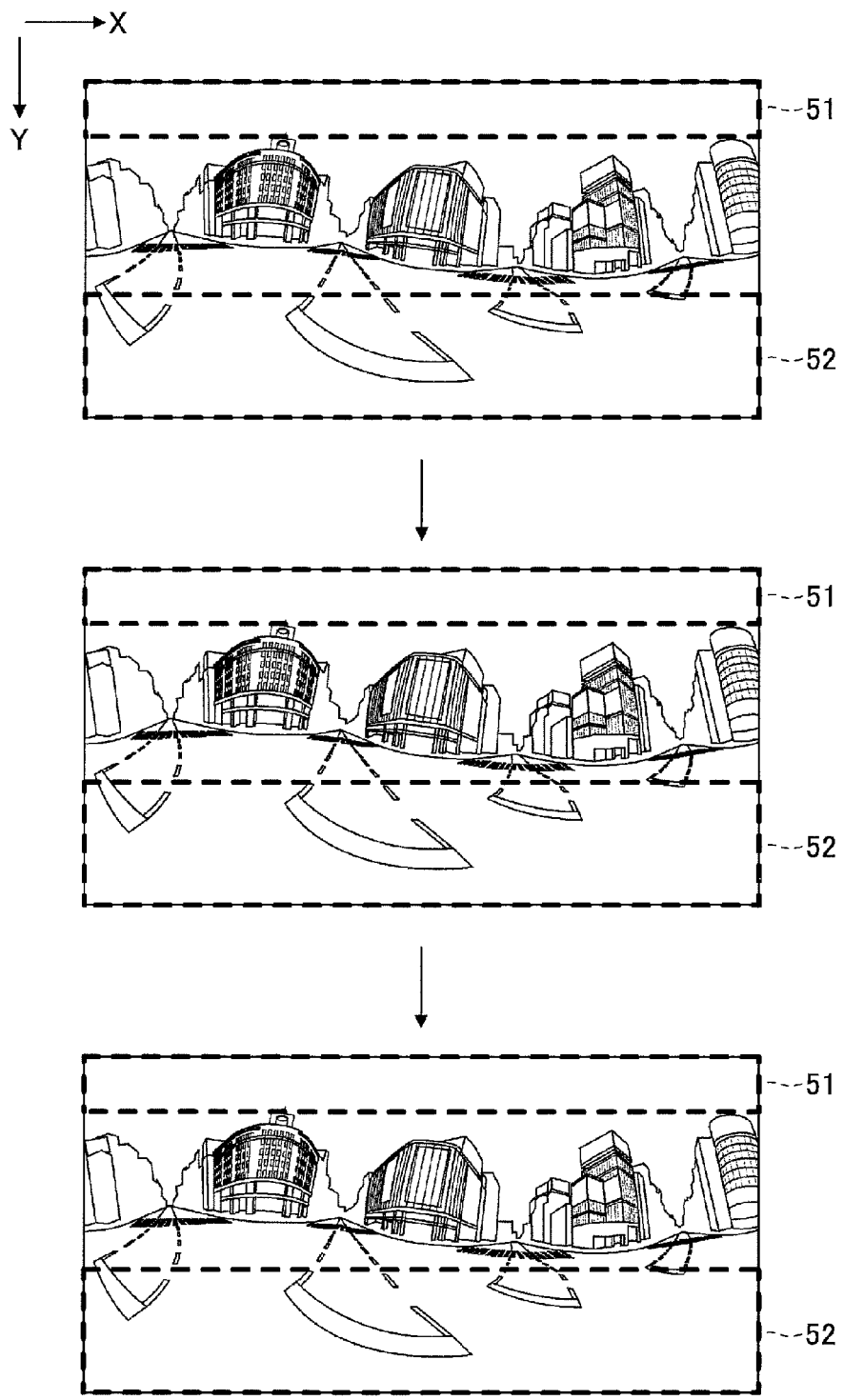
FIG. 12 is a diagram showing an example of deleting a predetermined region from an omnidirectional image.

FIG. 12 is a diagram explaining a data deletion range. In FIG. 12, three successive frames are shown. The imaging apparatus 7 includes an acceleration sensor, which detects a tilt of the imaging apparatus 7 with respect to the ground. The imaging apparatus 7 is subject to tilt correction such that the vertical direction of an omnidirectional image being captured may be perpendicular to the ground. Thus, assuming direction X represents the horizontal direction of the omnidirectional image and direction Y represents the vertical direction of the omnidirectional image in FIG. 12, the sky is captured in a region where the Y coordinate values are small, and the ground is captured in a region where the Y coordinate values are large. Thus, for example, a sky region 51 may take up 10-15% of the height of the omnidirectional image starting from where the Y-coordinate value is zero, and a ground region 52 may take up 10-15% of the height of the omnidirectional image starting from where the Y coordinate value is at its maximum value.

Note that the widths of the sky region 51 and the ground region 52 are not necessarily constant, and as such, the sky region 51 and the ground region 52 may be detected through image processing. For example, the sky region 51 would presumably be in a sky color (light blue, blue, gray, white, etc.) and include few sharp edges. Thus, for example, the sky region 51 may be detected by detecting the color of each predetermined pixel block and identifying pixel blocks in a continuous sky color as a candidate for the sky region 51. Also, the edge density of each predetermined pixel block may be calculated by detecting sharp edges above a predetermined value in each pixel block and identifying continuous pixel blocks with an edge density below a predetermined value as a candidate for the sky region 51. Then, based on the two candidates for the sky region 51 the intersection or the union of the candidates may be identified as the sky regions 51.

Note that similar image processing may be performed for detecting the ground region 52 capturing a road surface, for example. However, in the case of detecting an image of a road, a road color (gray, brown, etc.) may be detected instead of a sky color, for example. As with the sky, a road generally includes few sharp edges. However, a road may include white lines or curbs, for example. In this respect, in detecting a candidate for the ground region 52, even when an edge is detected in a pixel block, when such an edge is determined to be a straight line, this may be representing a line or a curb on the road, for example, and as such, the pixel block may still be considered a candidate for the ground region 52. Note that a straight line can be detected using a suitable technique, such as the Hough transform.

In this way, for example, as shown in FIG. 12, a top 10% height portion of the omnidirectional image may be identified as the sky region 51, and a bottom 15% height portion of the omnidirectional image may be identified as the ground region 52. Thus, the data deletion determining unit 14 may decide to delete the identified sky region 51 and ground region 52 from the omnidirectional image.

Figure 13:
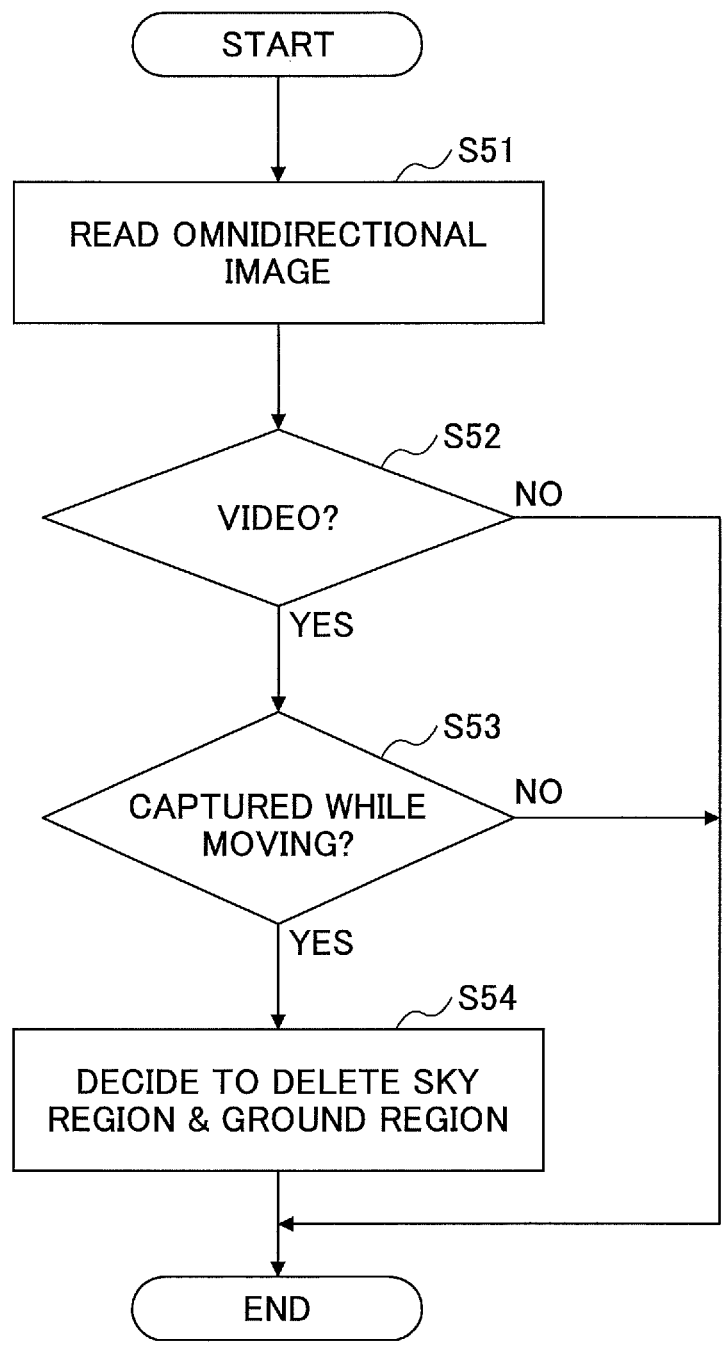
FIG. 13 is a flowchart showing an example procedure implemented by the data deletion determining unit for deleting a sky region and a ground region from an omnidirectional image.

FIG. 13 is a flowchart showing an example procedure implemented by the data deletion determining unit 14 to delete the sky region 51 and the ground region 52 from the omnidirectional image according to the present embodiment. Note that the process of FIG. 13 may be started at the time the data deletion determination process of step S10 shown in FIG. 7 is started.

In step S51, the read/write unit 19 reads (retrieves) content including an omnidirectional image from the omnidirectional image management DB 1001.

Then, in step S52, the data deletion determining unit 14 determines whether the retrieved omnidirectional image is a video image. Note that if information indicating whether the omnidirectional image is a video image or a still image is attached to content stored in the omnidirectional image management DB 1001, the read/write unit 19 may be arranged to only retrieve content including a video image, for example. If the omnidirectional image is not a video image, the process is ended.

If the omnidirectional image is a video image (YES in step S52), the process proceeds to step S53 where the data deletion determining unit 14 determines whether the omnidirectional image has been captured while moving. If the omnidirectional image has not been captured while moving, the process is ended.

If the omnidirectional image has been captured while moving (YES in step S53), the process proceeds to step S54 where the data deletion determining unit 14 detects the sky region 51 and the ground region 52 of the omnidirectional image and decides to delete the detected sky region 51 and ground region 52 from the omnidirectional image.

As described above, in the image display system 100 according to the present embodiment, when an omnidirectional image is a video image captured while moving, the sky region 51 and the ground region 52 of the omnidirectional image that are not likely to be viewed are deleted and the omnidirectional image that is more likely to be viewed is preferentially transmitted.

[Third Embodiment]

In the following, the image display system 100 according to a third embodiment of the present invention is described. In the image display system 100 according to the present embodiment, when content includes an omnidirectional video image captured while moving, the data size the omnidirectional video image is reduced by deleting a region opposite the moving direction in order to reduce the download time of the omnidirectional video image.

Note that the functional configurations of the image processing server 10 and the image display terminal 30 of the image display system 100 according to the present embodiment may be substantially identical to those of the second embodiment as shown in FIG. 11. However, in the present embodiment, the data deletion determining unit 14 has functional features that differ from those of the second embodiment.

Figure 14:
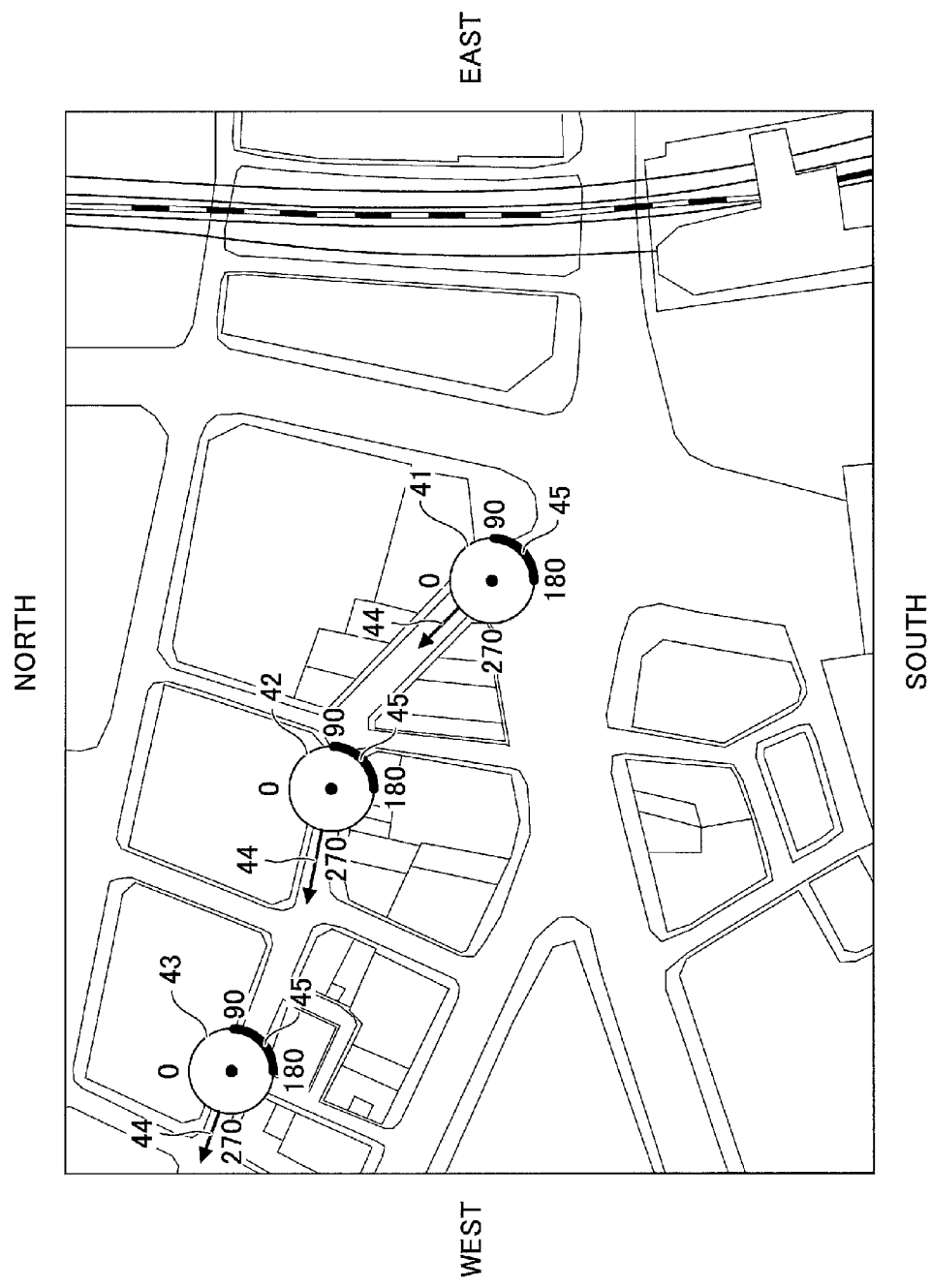
FIG. 14 is a diagram schematically showing a plurality of image capturing positions of omnidirectional images.

In the following, the functional features of the data deletion determining unit 14 according to the present embodiment are described with reference to FIG. 14. FIG. 14 is a diagram schematically showing image capturing positions of a plurality of omnidirectional images 41-43. For example, in a case where the omnidirectional images 41, 42, and 43 are captured in the above recited order, moving directions 44 as indicated by arrows in FIG. 14 may be detected. Note that orientation information (such as north, south, east, and west) may be attached to the omnidirectional images, and the moving direction 44 may be detected based on such orientation information, for example. In the following, for convenience of explanation, a direction pointing toward the north on a reference plane parallel to the ground is set to 0 degrees as the reference direction and the moving direction 44 is represented by a positive angle measured clockwise from the reference direction.

Taking the omnidirectional image 41 as an example, the moving direction 44 of the omnidirectional image 41 is about 315 degrees and the opposite direction with respect to the moving direction 44 is about 135 degrees. Thus, the data deletion determining unit 14 may determine an angle range within a predetermined angle from the 135-degree angle as a rear range 45 of the omnidirectional image 41. For example if the predetermined angle is 45 degrees, the rear range 45 may be an angle range between 90 degrees and 180 degrees. The data deletion determining unit 14 may then decide to delete such a rear range 45 from the omnidirectional image 41. Note that rear ranges 45 of the omnidirectional images 42 and 43 may be deleted in a similar manner.

Figure 15:
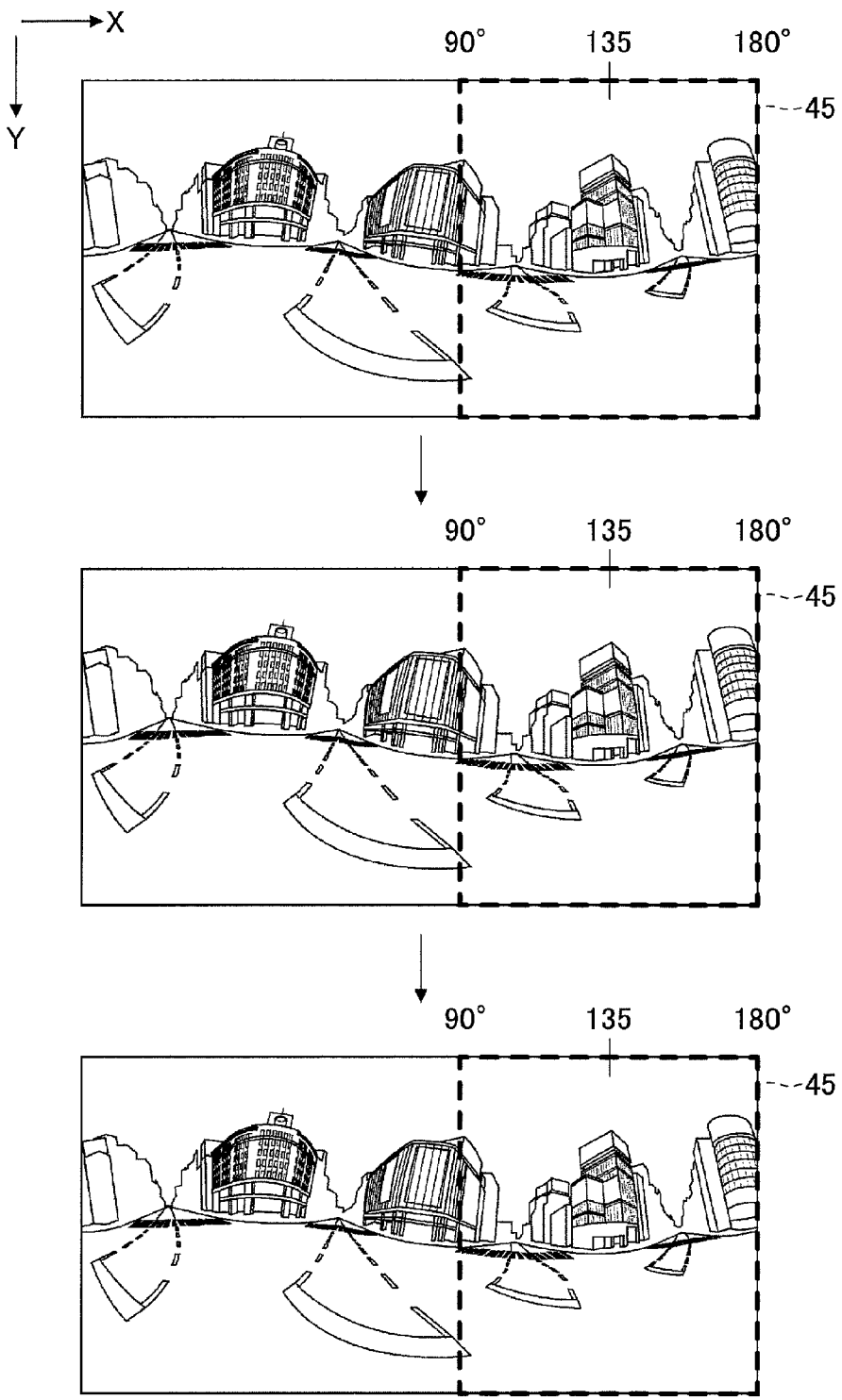
FIG. 15 is a diagram showing an example of deleting a rear range opposite a moving direction of an omnidirectional image.

FIG. 15 shows an example of deleting the rear range 45 opposite the moving direction 44 from an omnidirectional image. In FIG. 15, three successive frames are shown. As described above with reference to FIG. 14, the rear range 45 identified by the data deletion determining unit 14 is deleted from each of the three frames. Note that in the example of FIG. 15, the rear range 45 to be deleted from each of the frames is the same. As in this example, the rear range 45 to be deleted may be maintained the same while the moving direction 44 is in a range that can be regarded as substantially the same (e.g., while variations in the moving direction 44 is within 10 degrees).

Figure 16:
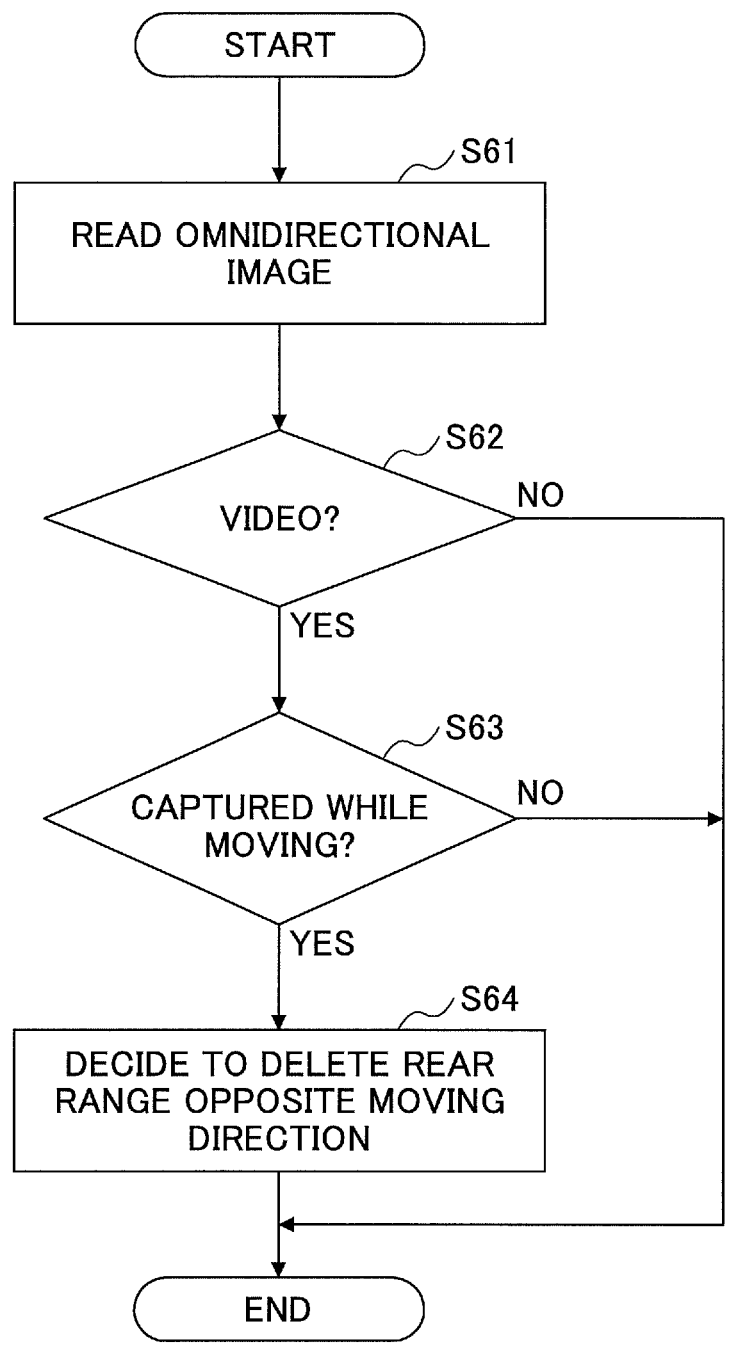
FIG. 16 is a flowchart showing an example procedure implemented by the data deletion determining unit for deleting the rear range opposite the moving direction of an omnidirectional image.

FIG. 16 is a flowchart showing an example procedure implemented by the data deletion determining unit 14 to delete the rear range 45 in the opposite direction with respect to the moving direction 44 from the omnidirectional image. Note that the processes of steps S61-S63 of FIG. 16 may be substantially identical to the processes of steps S51-S53 of FIG. 13. Thus, the process of step S64 is described below.

In step S64, the data deletion determining unit 14 decides to delete the rear range 45 in the opposite direction with respect to the moving direction 44.

As described above, in the image display system 100 according to the present embodiment, when an omnidirectional image is a video image captured while moving, the rear range 45 of the omnidirectional image that is not likely to be viewed is deleted and the omnidirectional image around the moving direction 44 is preferentially transmitted.

Note that the present embodiment may also be implemented in combination with the second embodiment, for example. That is, after deleting the rear range 45 from the omnidirectional image, the sky region 51 and the ground region 52 may also be deleted from the resulting omnidirectional image, for example. In this way, the data size of the omnidirectional image to be transmitted from the image processing server 10 to the image display terminal 30 can be further reduced.

[Fourth Embodiment]

In the following, the image display system 100 according to a fourth embodiment of the present invention is described. In the image display system 100 according to the present embodiment, in the case where content includes an omnidirectional video image captured while moving, the data size of the omnidirectional image is reduced by deleting regions other than a field-of-view (FOV) region centered around the moving direction of the omnidirectional image in order to reduce the download time of the omnidirectional image.

Note that functional configurations of the image processing server 10 and the image display terminal 30 of the image display system 100 according to the present embodiment may be substantially identical to those of the second embodiment as shown in FIG. 11. However, in the present embodiment, the data deletion determining unit 14 has functional features that differ from those of the second embodiment and the third embodiment. As described above with reference to FIG. 14 relating to the third embodiment, the data deletion determining unit 14 is capable of determining the moving direction 44 of the content registrant 8 (user) capturing the omnidirectional image. After the data deletion determining unit 14 determines the moving direction 44, the data deletion determining unit 14 identifies a certain region centered around the moving direction 44 (e.g., ranging between −30 degrees and +30 degrees from the moving direction 44 in the longitude direction and ranging between −30 degrees and +30 degrees from a reference plane of the moving direction 44 in the latitude direction) as a field-of-view (FOV) region of the user (content registrant 8). In the example of FIG. 14, the direction at 315 degrees from the center of the sphere representing the omnidirectional image 41 is determined to be the moving direction 44. This direction corresponds to the longitudinal direction, and the FOV region may range between −30 degrees and +30 degrees from the moving direction 44 at 315 degrees in the latitude direction. Also, the FOV region may range between −30 degrees and +30 degrees from the road surface (reference plane) of the moving direction 44 at 315 degrees in the latitude direction (i.e., direction perpendicular to the road surface). In the present embodiment, the data deletion determining unit 14 identifies such a FOV region and determines to delete regions of the omnidirectional image other than the identified FOV region.

Figure 17:
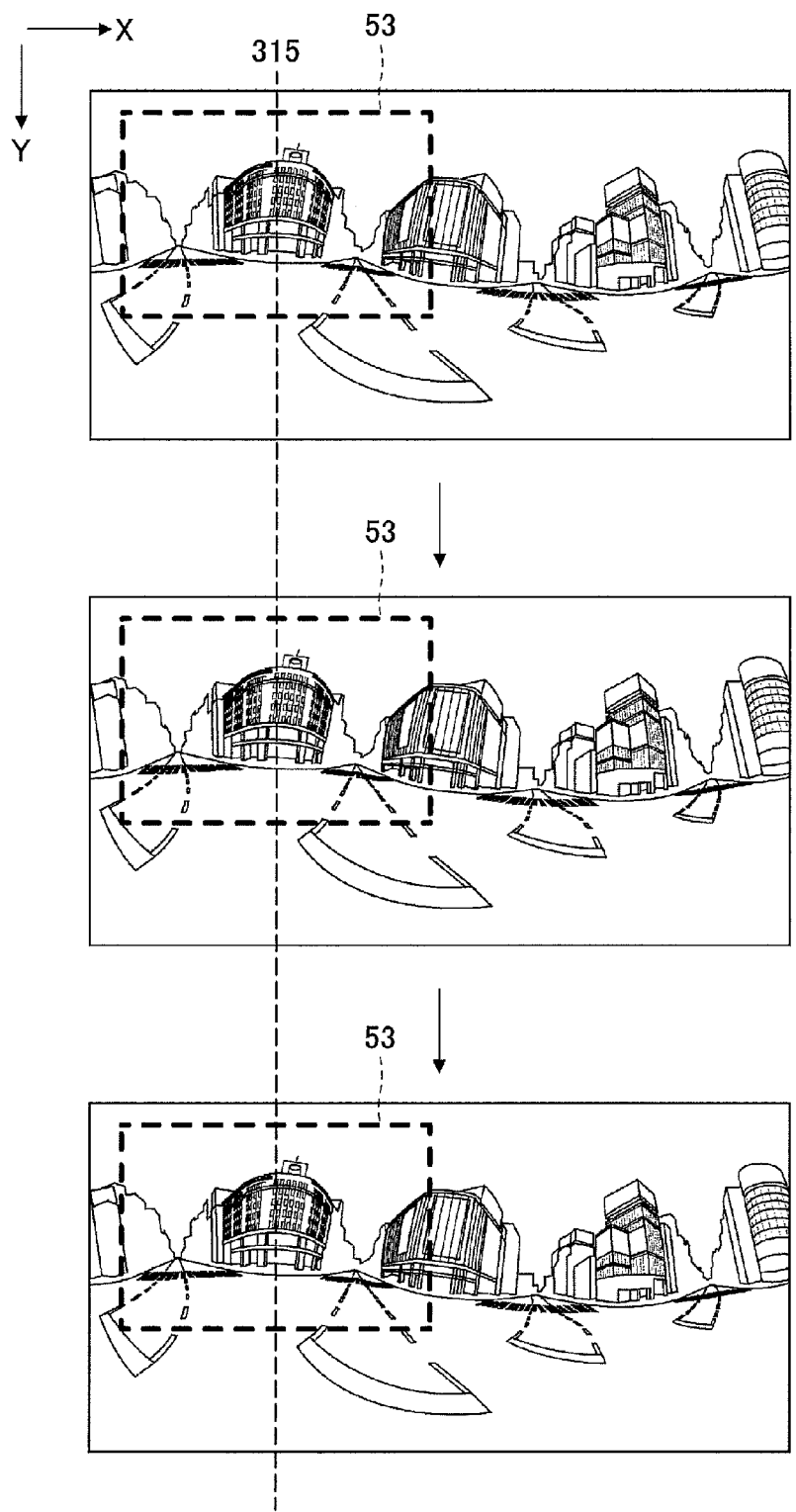
FIG. 17 is a diagram showing an example of a field of view region of an omnidirectional image.

FIG. 17 shows an example of a FOV region 53 of an omnidirectional image. In FIG. 17, three successive frames are shown. The data deletion determining unit 14 may identify the FOV region 53 of each of the frames and determine the regions other than the FOV region 53 that are to be deleted from the omnidirectional image.

Figure 18:
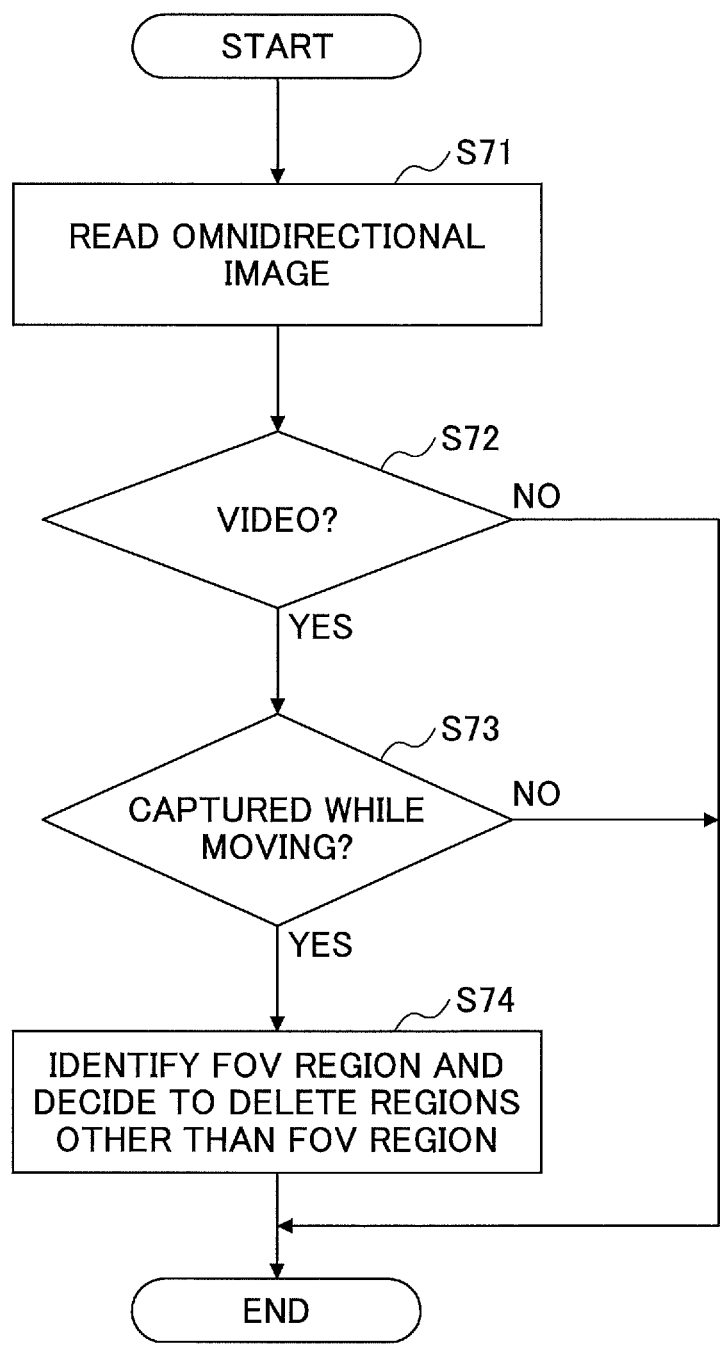
FIG. 18 is a flowchart showing an example procedure implemented by the data deletion determining unit for deleting regions other than the the field of view region from an omnidirectional image.

FIG. 18 is a flowchart showing an example procedure implemented by the data deletion determining unit 14 to delete regions other than the FOV region 53 from the omnidirectional image. Note that the processes of steps S71-S73 of FIG. 18 may be substantially identical to steps S51-S53 of FIG. 13. In the following, the process of step S74 of FIG. 18 is described.

In step S74, the data deletion determining unit 14 identifies the FOV region 53 and decides to delete regions other than the FOV region 53 from the omnidirectional image.

Thus, in the image display system 100 according to the present embodiment, only a field-of-view region of the omnidirectional image that is likely to be viewed is retained such that the omnidirectional image can be efficiently transmitted.

[Fifth Embodiment]

In the following, the image display system 100 according to a fifth embodiment of the present invention is described. The image display system 100 according to the present embodiment enables a user to monitor or view, over time, a given location of an omnidirectional image captured by the imaging apparatus 7 that is fixed in place for at least a certain period of time. An observation method using an imaging apparatus that is fixed in place is referred to as "fixed-point observation". While the imaging apparatus 7 may typically be held by a user in capturing an omnidirectional image, the imaging apparatus 7 may also be used as a fixed-point camera installed in a building or outdoors, for example.

Figure 19:
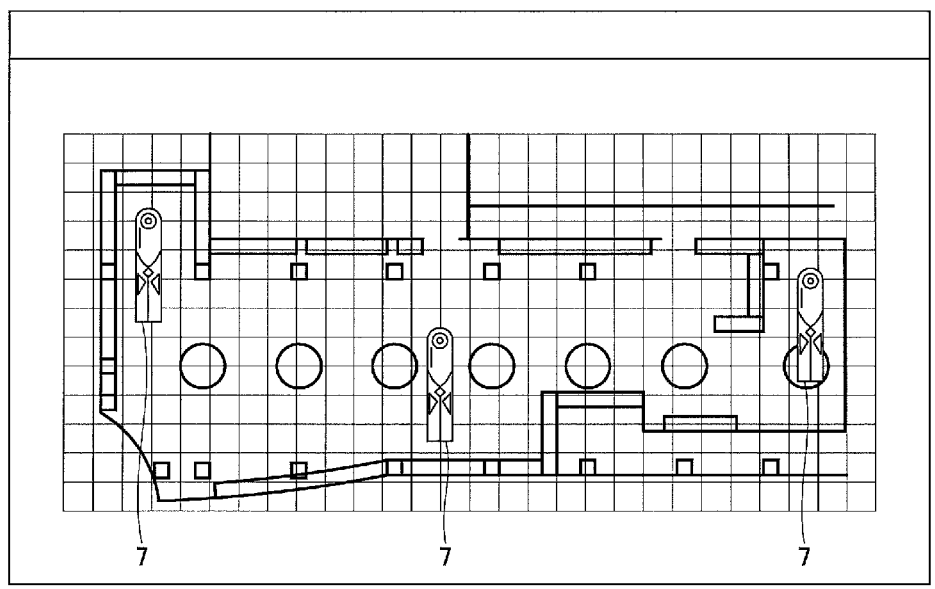
FIG. 19 is a diagram showing an example arrangement of imaging apparatuses and a layout of a building.

FIG. 19 shows an example arrangement of imaging apparatuses 7 together with a layout of a building. By arranging the imaging apparatuses 7 as shown in FIG. 19, for example, the imaging apparatuses 7 may be used for the purpose of behavioral analysis of consumers at a store or some other type of establishment. For example, the imaging apparatuses 7 installed in the store/establishment may periodically capture omnidirectional images and store the captured omnidirectional images in the image processing server 10. In this way, a user (e.g., store operator) conducting behavioral analysis may be able to receive the omnidirectional images from the image processing server 10 as time series data. Thus, the user may be able to analyze how consumers visiting the store go about purchasing (or not purchasing) an item, how the staff attend to the consumers, and the like. The user may then utilize the analysis result in developing a sales plan and the like, for example.

In the case where a user, such as a store operator, is to use time series of omnidirectional images captured at a fixed point, the viewpoint to be analyzed is limited. Moreover, there is a demand for enabling analysis of a fixed viewpoint. In this respect, analysis of a fixed point may be enabled by recording the number of views for each cell of the omnidirectional images and storing cells with a large number of views as described above in connection with the first embodiment, for example.

On the other hand, the viewpoint to be analyzed may vary depending on the type of position and/or responsibilities of the store operator (user) analyzing the omnidirectional images, for example. In this respect, the image processing server 10 may be configured to store and manage a view region management table with respect to each user in order to provide omnidirectional images capturing a viewpoint range relevant to each user based on his/her position and responsibilities, for example.

Further, the viewpoint to be analyzed may vary depending on the time slot, such as before opening, during open hours, after closing, during peak hours, and during off-peak hours, for example. In this respect, the image processing server 10 may be configured to store and manage view region information with respect to each time slot in order to enable analysis relevant to each time slot, for example.

Note that functional configurations of the image processing server 10 and the image display terminal 30 of the image display system 100 according to the present embodiment may be substantially identical to those of the first embodiment as shown in FIG. 6. Also, the overall operation procedure of the image display system 100 according to the present embodiment may be substantially similar to the operation procedure shown in FIG. 7.

<View Region Management for Different Time Slots>

Figure 20:
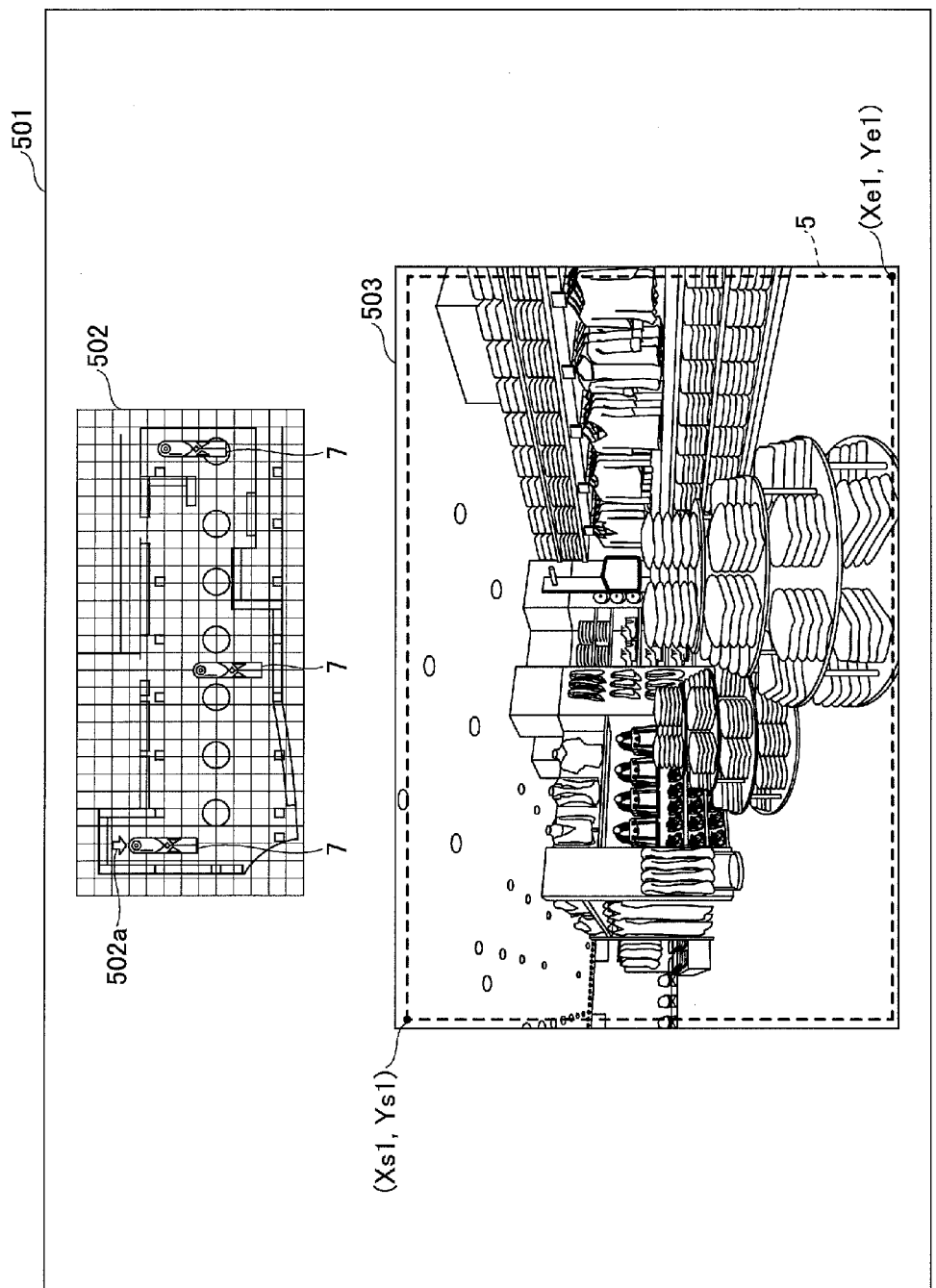
FIG. 20 shows an example of a view screen displayed on the image display terminal by a user.

In the following, referring to FIG. 20, a view region 5 viewed by a user included in an omnidirectional image captured by the imaging apparatus 7 is described. FIG. 20 shows an example of a view screen 501 displayed on the image display terminal 30 by the user. The view screen 501 includes a layout field 502 and a video field 503. The layout field 502 of FIG. 20 displays the layout shown in FIG. 19 and enables the user to select the imaging apparatus 7 that has captured the omnidirectional image to be viewed by the user. Note that the imaging apparatus 7 that has been selected by the user may be indicated by an arrow 502a, for example. The video field 503 displays the omnidirectional image captured by the selected imaging apparatus 7. More specifically, the video field 503 displays the view region 5 of the omnidirectional image.

As shown in FIG. 20, the view region 5 viewed by the user is identified by X and Y coordinates. When the user inputs an operation for changing the view region 5, the operation input accepting unit 33 accepts such a user operation, and the image rotating unit 34 rotates the omnidirectional image. The view region recording unit 35 records the view region 5 of the omnidirectional image that has been continually displayed for at least a certain time period.

Note that in the present embodiment, image capturing time information of an omnidirectional image is attached to the omnidirectional image. Thus, for example, based on the image capturing time information, the view region recording unit 35 of the image display terminal 30 may record view region information of the view region 5 for each 30-minute time slot. The view region information for the different time slots is then transmitted to the image processing server 10. In this way, the number of views for each cell may be stored and managed with respect to each time slot, for example.

Note that in the present embodiment, the image processing server 10 may implement a data deletion determination process that is substantially identical to that implemented in the first embodiment. However, in the present embodiment, the data deletion determining unit 14 determines data to be deleted with respect to each time slot.

<<Recording Number of Views>>

Figure 21:
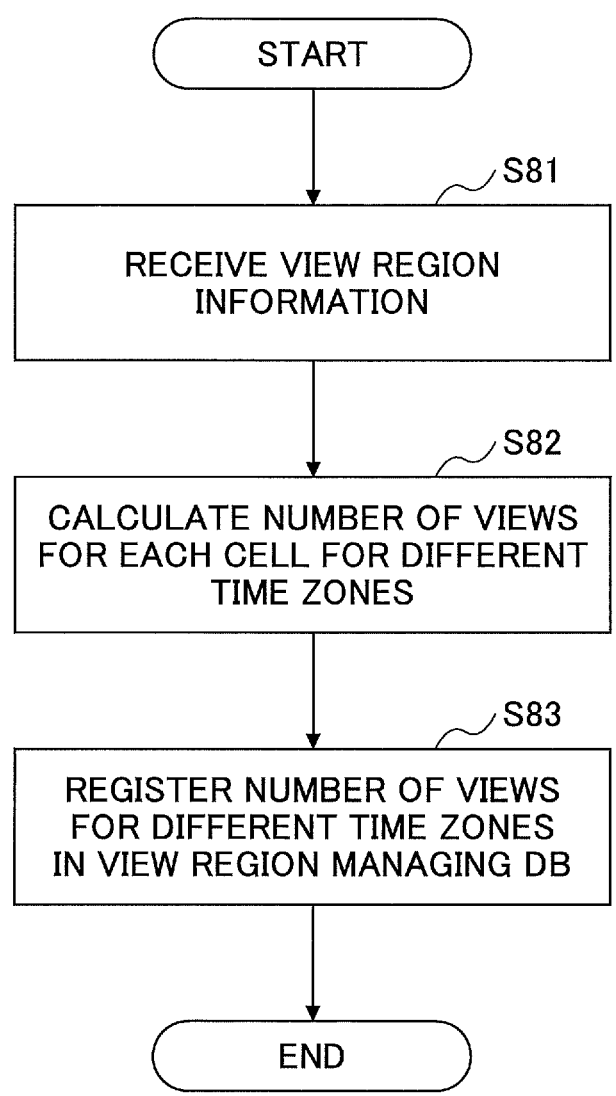
FIG. 21 is a flowchart showing an example procedure implemented by the image processing server for registering the number of times a cell has been viewed with respect to each time slot.

FIG. 21 is a flowchart showing an example procedure implemented by the image processing server 10 of the present embodiment for recording the number of views for each cell. Note that the process of FIG. 21 may be performed with respect to each imaging apparatus 7. Also, the process of FIG. 21 is executed each time view region information is transmitted to the image processing server 10.

For example, the image display terminal 30 may transmit a content ID and view region information for different time slots to the image processing server 10. In turn, in step S81, the communication unit 11 of the image processing server 10 receives the view region information. Note that if the content includes a still image, the view region recording unit 35 of the image display terminal 30 may determine the relevant time slot of the view region information based on the image capturing time information of the still image. Alternatively, the image display terminal 30 may transmit the image capturing time information and the view region information to the image processing server 10. Note that in the previously described embodiments, the continuous recording method or the frame-by-frame recording method is used to record the view regions of a video image. In the present embodiment, the number of views for each cell is recorded at least with respect to each time slot. For example, the view region recording unit 35 of the image display terminal 30 may determine the relevant time slot of each frame constituting the video image based on the image capturing time information of each frame and transmit the view region information of the video image together with the time slot information.

Then, in step S82, the view region managing unit 13 of the image processing server 10 calculates the number of views for each cell for the different time slots. That is, based on the view region information for the different time slots, the view region managing unit 13 converts the view region information of the view region 5 for each time slot into cell numbers of the cells representing the view region 5.

Then, in step S83, the view region managing unit 13 increments by one the number of views for the relevant cell numbers recorded with respect to each time slot in the view region management DB 1002. The view region managing unit 13 also increments the number of viewers recorded in the view region management DB 1002 by one. In this way, the number of views for each cell may be recorded with respect to each time slot.

<<View Region Management Table>>

In the following, examples of view region management tables stored and managed in the view region management DB 1002 according to the present embodiment are described.

TABLE 4A

View Region Management Table

| 9:00~9:30 | | |
| 8:30~9:00 | COORDINATE INFORMATION | NUMBER OF VIEWS |
| 8:00~8:30 | COORDINATE INFORMATION | NUMBER OF VIEWS |
| CELL NUMBER | COORDINATE INFORMATION | NUMBER OF VIEWS |
| 1 | (X, Y) (X, Y) | 0 |
| 2 | (X, Y) (X, Y) | 2 |
| 3 | (X, Y) (X, Y) | 1 |
| 4 | (X, Y) (X, Y) | 2 |
| ... | ... | ... |

The above Table 4A schematically shows an example of a view region management table according to the present embodiment. Note that the view region management table as shown in Table 4A is created for each imaging apparatus 7.

Also, note that the following descriptions mainly relate to features of the view region management table of Table 4A that differs from Table 2. In the present embodiment, a view region management table may be created for each time slot (time interval) of 30 minutes, for example. Note that the time slots may also be separated by one hour, several hours, or even a longer period of time. Also, time slots unique to the store may be defined, such as hours before opening, hours after opening, lunch time, evening time, and hours after closing, for example.

Also, the view region managing unit 13 of the image processing server 10 may determine the day of the week an omnidirectional image was captured by the imaging apparatus 7 based on a calendar and date/time information of the omnidirectional image, for example. In this way, a view region management table for each day of the week may be created as shown in Table 4B below.

TABLE 4B

View Region Management Table

| CELL NUMBER | COORDINATE INFORMATION | NUMBER OF VIEWS |
|---|---|---|
| 1 | (X, Y) (X, Y) | 0 |
| 2 | (X, Y) (X, Y) | 2 |
| 3 | (X, Y) (X, Y) | 1 |
| 4 | (X, Y) (X, Y) | 2 |
| ... | ... | ... |

(MON / TUE / WED tabs shown)

The above Table 4B shows an example of a view region management table created for each day of the week. Based on such information, the image processing server 10 may determine a suitable cell to be deleted in a case where the user wishes to monitor different regions depending on the day of the week, for example.

Further, Table 4A and Table 4B may be used in combination to create a view region management table storing for each time slot and for each day of the week, for example. In addition, the view region management table may be created with respect to different weather conditions (e.g., sunny, cloudy, rain, snow, etc.), for example.

<<Cell Deletion Determination>>

Figure 22:
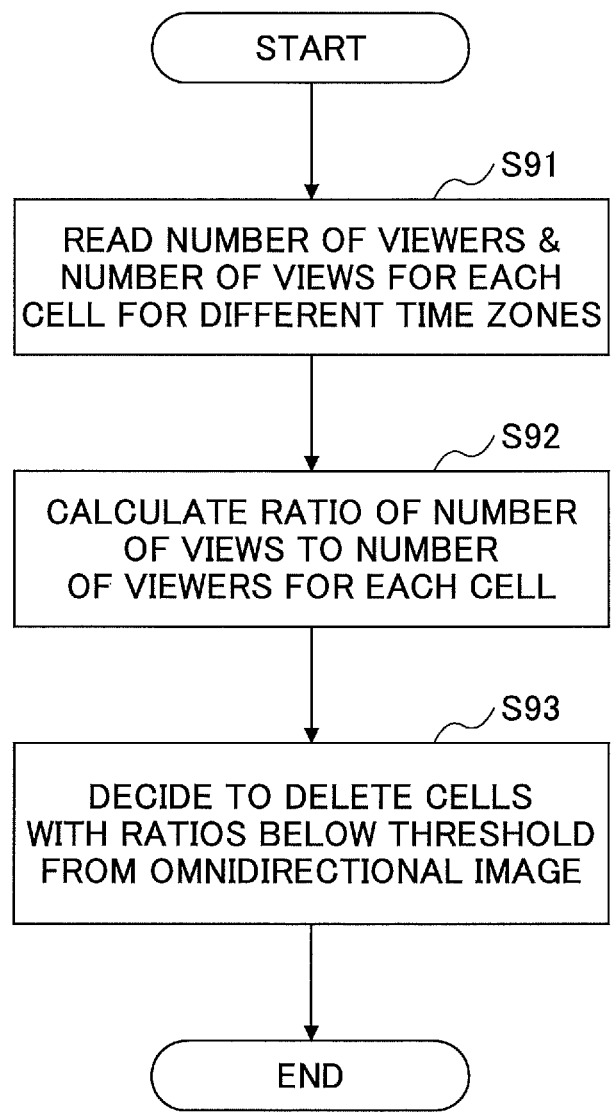
FIG. 22 is a flowchart showing an example procedure implemented by the data deletion determining unit for determining a cell to be deleted with respect to each time slot.

FIG. 22 is a flowchart showing an example procedure implemented by the data deletion determining unit 14 of the present embodiment for determining a cell to be deleted. Note that the following descriptions mainly relate to process steps of FIG. 22 that differ from those of FIG. 9A. Also, note that the process of FIG. 22 is performed for each imaging apparatus 7.

In step S91, the data deletion determining unit 14 of the present embodiment reads (retrieves) the number of viewers and the number of views for each cell for the different time slots from the view region management DB 1002. Note that the process of step S92 may be substantially identical to the process of step S22 of FIG. 9A.

Then, in step S93, the data deletion determining unit 14 identifies a cell with a ratio of the number of views to the number of viewers falling below a threshold with respect to each time slot, and decides to delete such a cell from the omnidirectional image. The image editing unit 15 refers to the image capturing time information of the omnidirectional image to determine the relevant time slot and deletes the cell identified in step S93 from the omnidirectional image. In this way, video content with different cells deleted for different time slots may be obtained, for example. That is, in the present embodiment, different cells may be deleted from one piece of video content depending on the image capturing time of a given frame, for example. In the case of a still image, the cell to be deleted may be determined based on the image capturing time of the still image.

Note that although the process of FIG. 22 has been described with reference to FIG. 9A, the cell deletion determination method as shown in FIG. 9B that involves retaining a fixed number of cells with higher ratios than the other cells may be applied to the present embodiment, for example.

By deleting different cells with respect to each time slot as described above, an omnidirectional image (still image or video image) with a large data size may be reduced in size based on its relevant time slot such that a region that is frequently viewed at the relevant time slot may be transmitted to the image display terminal 30. In this way, a user may be able to view a desired region of the omnidirectional image with little delay.

Also, note that even if the view region management table is created for each time slot, the data deletion determining unit 14 may aggregate the view region management tables for the different time slots to determine one or more cells to be deleted, for example. In this way, even if a given region is not viewed by the user at a given time slot, if the region is of interest to the user, deletion of cells corresponding to such a region may be prevented. To implement such a process, the user may operate the image display terminal 30 to send a relevant request to the image processing server 10, for example.

<View Region Management for Different Users>

As described above, a region of an omnidirectional image that is of interest may often vary depending on each user. For example, if a user is allowed to select a desired region of an omnidirectional image as the view region, a view region management table specific to the user may be created.

Figure 23:
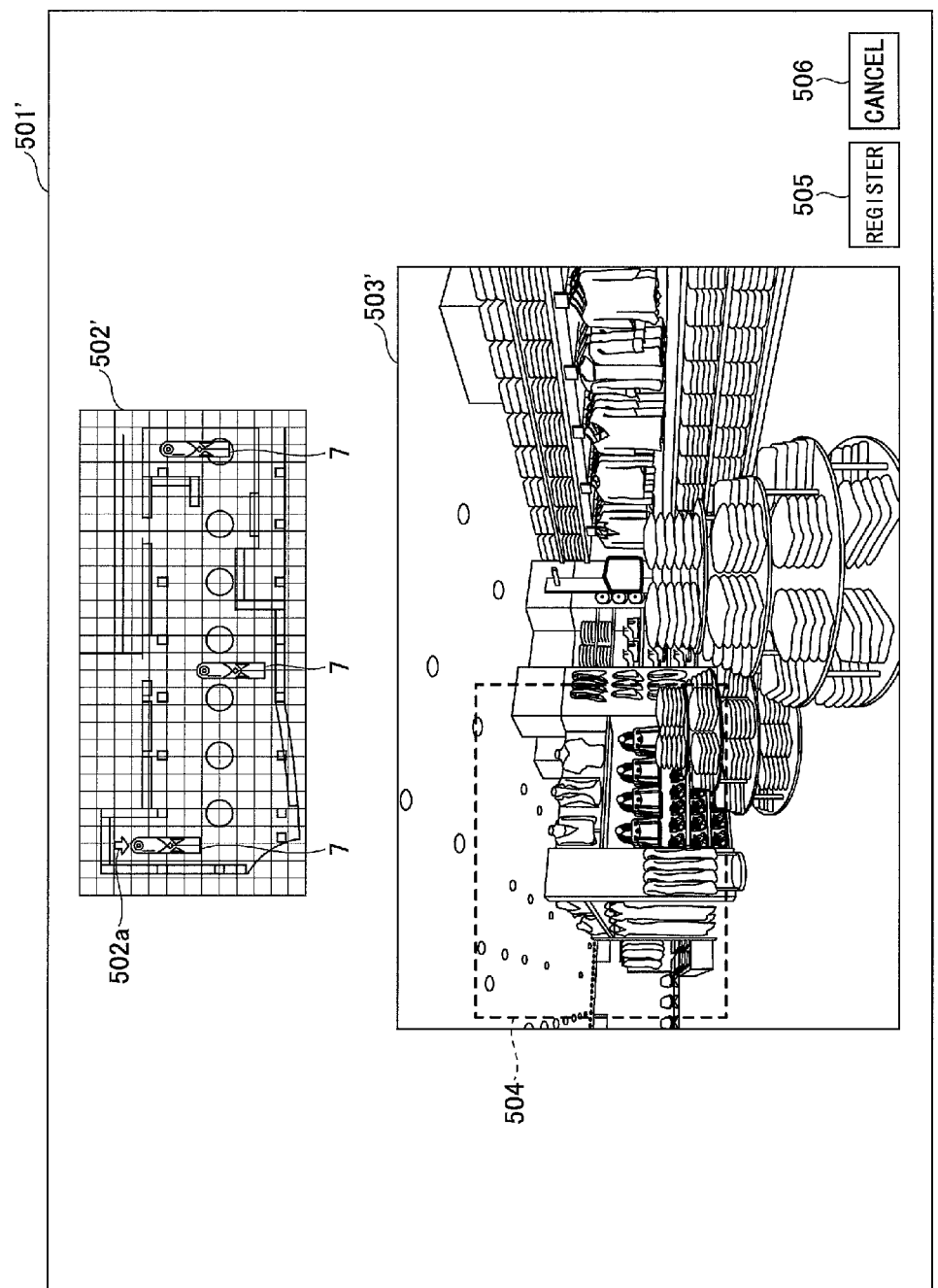
FIG. 23 is a diagram showing an example user interface for enabling a user to specify a discretionary view region.

FIG. 23 shows an example of a user interface enabling the user to specify a desired region of an omnidirectional image as a view region. The user interface of FIG. 23 includes a view screen 501' that displays information substantially similar to that displayed in the view screen 501 of FIG. 20. The view screen 501' displays a layout field 502', a video field 503', a register button 505, and a cancel button 506. The video field 503 displays content including an omnidirectional image acquired from the image processing server 10 by the user. The operation input accepting unit 33 accepts user operations input by the user via the touch panel 216, for example. In this way, the user can perform operations such as rotating, enlarging, and/or reducing the omnidirectional image displayed in the video field 503'. Also, the user can specify any desired region (e.g., a region the user wishes to monitor) within the omnidirectional image via the touch panel 216 to create discretionary view region 504. When the discretionary view region 504 is displayed in the video field 503' and the user presses the register button 505, discretionary view region information including coordinate information of the discretionary view region 504 and a user ID of the user may be transmitted to the image processing server 10. The user ID is user identification information that uniquely identifies the user. Note that the user ID may also be referred to as "user information" or "user-specific information" and may be any type of information that can identify the user. Specific examples of such information include, but are not limited to, an employee number, a name, an e-mail address, and the like.

The image processing server 10 may be able to identify the user ID by requiring the user to login before viewing the omnidirectional image, for example. Alternatively, the user may simply enter his/her user ID in the image display terminal 30, and the image display terminal 30 may transmit the user ID together with the discretionary view region information to the image processing server 10.

As described above, the user can register any desired region, such as a region the user wishes to monitor, as the discretionary view region 504 via the user interface. Because the discretionary view region 504 is explicitly specified at the discretion of the user, image data of interest to the user may be easily identified and image data that is less important to the user may be deleted.

Note that in the present example, a view region management table is created for each user. Also, note that when the discretionary view region 504 is registered, one or more cells corresponding to the discretionary view region 504 will be regarded as having viewed once in the image processing server 10, and the number of views for the corresponding cells may be recorded in the view region management DB 1002. Further, when the same or a different discretionary view region 504 is registered again by the user, the number of views for the cells that overlap with the previously registered discretionary view region 504 may be incremented by one.

The image editing unit 15 can edit an omnidirectional image (i.e., delete cells) at the time a view region management table for the omnidirectional image has been created. However, a large amount of storage space of the storage unit 1000 may be required in the case where a reduced omnidirectional image that has undergone a cell deletion process is created for each user. Accordingly, the omnidirectional image may be edited upon receiving a view request from the image display terminal 3. For example, when a user provides a user ID to the image processing server 10 upon requesting to view content data, the image editing unit 15 may delete cells from the content data based on the view region management table for this user. In this way, the image display terminal 30 may receive and display a region that is likely to be viewed by this particular user.

In the example of FIG. 23 described above, a user is able to register a desired region of an omnidirectional image as the discretionary view region 504, and the image processing server 10 creates a view region management table for each user based on discretionary view region information of the discretionary view region 504 registered by the user. However, the image processing server 10 may similarly create a view region management table for each user based on view region information of the view region 5 viewed by a user as described above in connection with the first embodiment, for example. That is, by having the image display terminal 30 transmit a user ID of the user along with the view region information to the image processing server 10, the image processing server 10 may be able to create a view region management table for each user in a manner similar to the case where the discretionary view region 504 is registered by the user via a user interface.

<<Cell Deletion Determination>>

Figure 24B:
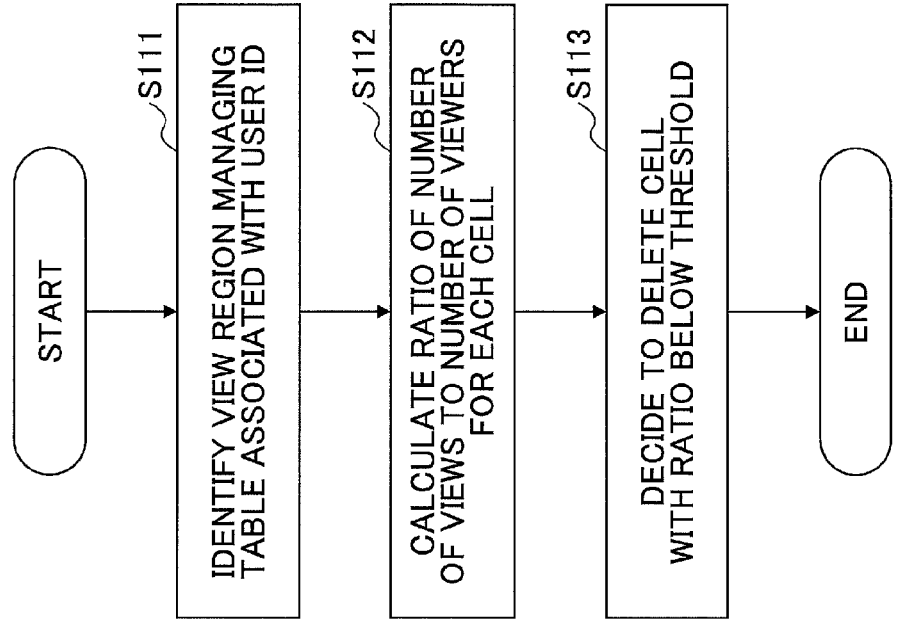
FIGS. 24A and 24B are flowcharts showing example procedures implemented by the data deletion determining unit for determining a cell to be deleted with respect to each individual user.
Figure 24A:
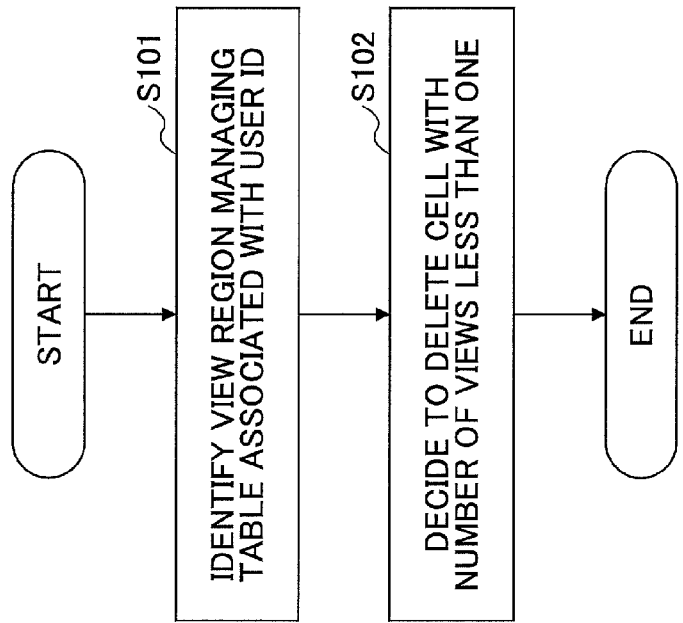

FIG. 24A is a flowchart showing an example procedure implemented by the data deletion determining unit 14 for determining a cell to be deleted from an omnidirectional image with respect to each user. The process of FIG. 24A is implemented in a case where a view region management table for each user is created based on discretionary view region information of a discretionary view region 504 registered by a user via a user interface.

In step 101, the data deletion determining unit 14 of the present embodiment identifies a view region management table associated with the user ID transmitted from the image display terminal 30.

Then, in step S102, the data deletion determining unit 14 decides to delete a cell with a number of views less than one (i.e., cell with a number of views equal to zero). That is, as described above, when a user transmits (registers) discretionary view region information specifying a discretionary view region 504, the number of views for cells representing the discretionary view region 504 is set to at least one in the view region management table for this user. The discretionary view region 504 specified by the user is to be constantly displayed for this user, and as such, the data deletion determining unit 14 may decide to delete the other cells with a number of views less than one (i.e., cells with a number of views equal to zero).

FIG. 24B is a flowchart showing an example procedure implemented by the data deletion determining unit 14 for determining a cell to be deleted in a case where a view region management table for each user is created based on view region information of the view region 5 viewed by a user.

Note that the process of step S111 of FIG. 24B may be identical to step S101 of FIG. 24A, and the processes of steps S112 and S113 may respectively be identical to steps S22 and S23 of FIG. 9A. Note, however, that the number of viewers used in calculating the ratio in step S112 corresponds to the number of times the same user has viewed the same content.

As described above, by transmitting view region information of the view region 5 or discretionary view region information of the discretionary view region 504 specific to each user to the image processing server 10, the image display terminal 30 may be able to display a region of an omnidirectional image relevant to each specific user according to his/her position and responsibilities, for example.

Note that in some embodiments, in determining a cell to be deleted from an omnidirectional image captured by a certain imaging apparatus 7, the data deletion determining unit 14 of the image processing server 10 may be arranged to determine one or more cells to be deleted based on a view region management table created for a user other than the user corresponding to the current viewer, for example. That is, when a user is transferred to a new store or the like, for example, the data deletion determining unit 14 may be arranged to delete cells based on the view history of the user's predecessor. In this way, takeover operations may be facilitated, and personnel changes may be smoothly implemented, for example. Also, in order to effectively utilize such view region management table stored and managed for each specific user, for example, an administrator of the image display system 100 may change the user ID associated with a given view region management table to another user ID identifying another user (e.g., successor in the store example described above).

<Viewing Content with Cells Deleted>

As described above with reference to FIG. 10, in a case where one or more cells are deleted from an omnidirectional image (content), the cells deleted from the omnidirectional image may be recovered by detecting a specific operation (e.g., image rotating operation performed a certain number of times within a certain time period) performed by the user. In the following, such a specific operation is described in more detail.

Figure 25A:
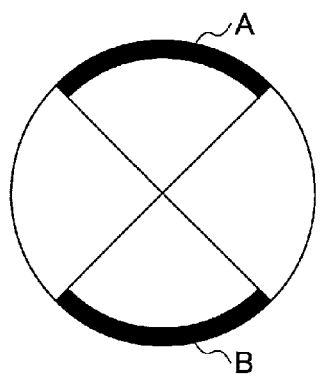
FIGS. 25A-25C are diagrams schematically showing examples of cells corresponding to a view region or a discretionary view region registered in a view region management database.
Figure 25B:
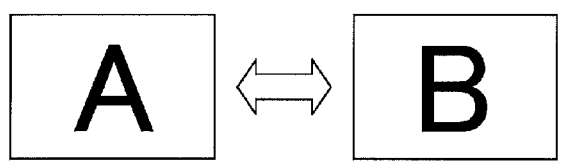
Figure 25C:
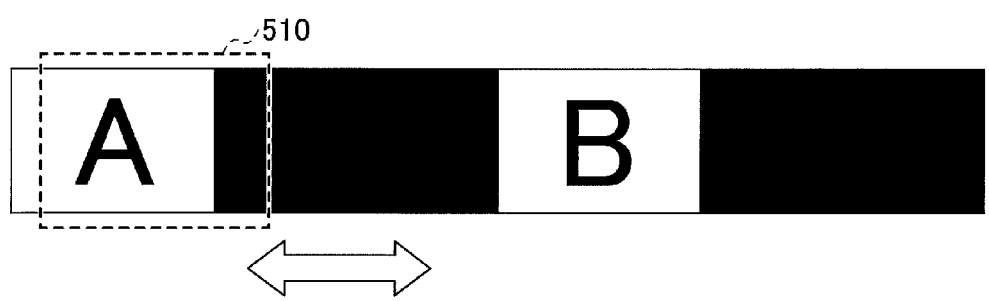

FIGS. 25A-25C are schematic top views of a view region or a discretionary view region of an omnidirectional image registered in a view region management table stored in the view region management DB 1002. Note that in FIGS. 25A-25C, regions formed by cells with a registered number of views (in the view region management table) greater than or equal to a threshold are represented as registered view regions A and B. That is, cells other than those corresponding to the registered regions A and B are deleted. Note that the image editing unit 15 may delete the cells from the omnidirectional image using one of two methods, referred to as method I and method II, described below.

Method I involves actually eliminating the cells other than those corresponding to the registered view regions A and B. In this case, the omnidirectional image may be split up and the registered view regions A and B may be displayed separately as individual images on the image display terminal 30. FIG. 25B schematically shows how the registered view regions A and B are displayed on the image display terminal 30 in such a case. That is, when the user rotates a screen while the registered view region A is displayed, the screen may immediately switch to displaying the registered view region B. Similarly, when the user rotates the screen while the registered view region B is displayed, the screen may immediately switch to displaying the registered view region A. In other words, the deleted cells are completely eliminated.

Method II involves replacing the cells other than the registered view regions A and B with black pixels or the like. In this case, one omnidirectional image including the registered view regions A and B and black pixels may be displayed on the image display terminal 30. FIG. 25C schematically shows how the registered view regions A and B are displayed on the image display terminal 30 in such a case. More specifically, in FIG. 25C, a region of the omnidirectional image within a frame 510 is displayed on the image display terminal 30. When the user rotates the screen in while the registered view region A is displayed, the registered view region B may be displayed after the black pixels are displayed. The same holds true in switching the display from the registered view region B to the registered view region A. That is, the user may not be able to alternate between displaying the registered view regions A and B without displaying the black pixels.

In the case of using method I, although the registered view regions A and B may be immediately displayed, it may be difficult for the user to determine the location of the registered view regions A and B within the omnidirectional image. In the case of using method II, the user may easily determine the location of the registered view regions A and B within the omnidirectional image, but the black pixels are inevitably displayed upon switching between the registered view regions A and B. In view of such advantages and disadvantages of the above methods I and II, the user is preferably allowed to select the cell deletion method to be used.

Note that in the case where the cells are deleted using method I, the specific operation for requesting the cells that have been deleted may be, for example, an operation of alternately displaying the registered view regions A and B at least a certain number of times within a given period of time. In the case where the cells are deleted using method II, the specific operation may be an operation of alternately displaying the registered view region A (or the registered view region B) and the black pixels a certain number of times within a certain period of time. Also, in the case where method II is used, the specific operation may be an operation in which the user continuously displays the black region (black pixels) for a certain period of time.

Also, in the present embodiment, the image display terminal 30 may be configured to acquire only the cells corresponding to a region the user wishes to view from among the cells that have been deleted, or the image display terminal 30 may acquire all the cells that have been deleted, for example. Also, the image display terminal 30 may request the image processing server 10 to send the entire omnidirectional image. For example, in a case where the layout of a store has been substantially altered, the image display terminal 30 may request the image processing server 11 to send the entire omnidirectional image. In this case, the image display terminal 30 may also request the image processing server 10 to delete the view region management table for the omnidirectional image. In this way, the image processing server 10 may create a new view region management table suitable for the new layout of the store, for example.

As described above, according to an aspect of the present embodiment, when the imaging apparatus 7 is used for fixed-point observation, a region of an omnidirectional image that is of interest to the user may be specified such that the image display terminal 30 may promptly display such a region at the time the omnidirectional image is transmitted to the image display terminal 30. Also, the image display terminal 30 can display a suitable region depending on the time and/or the user, for example.

Note that the imaging apparatus 7 is not limited to being installed within a building or the like and may also be installed outdoors, for example. Also, in addition to being installed in a store, the imaging apparatus 7 may be installed in an office, a corridor, a passageway, a front desk of a public institution, a shopping district, an intersection, a station, and the like.

<Other Applications>

Although the present invention has been described above with reference to illustrative embodiments, the present invention is not limited to these embodiments and many modifications and substitutions may be made within the scope of the present invention.

For example, the first embodiment, the image processing server 10 transmits an omnidirectional image that has undergone a cell deletion process to the image display terminal 30. However, the image processing server 10 may also be configured to display the omnidirectional image stored in the omnidirectional image management DB 1001. Also, in some embodiments, the omnidirectional image management DB 1001 may be provided in the image display terminal 30, and the image display terminal 30 may be configured to read (retrieve) the omnidirectional image from the omnidirectional image management DB 1001 and display the retrieved omnidirectional image on the display 215.

Also, the functional configurations of the image processing server 10 and the image display terminal 30 as shown in FIG. 6 and the like are merely illustrative examples provided to facilitate understanding of the processes of the image processing server 10 and the image display terminal 30. For example, in some embodiments, a plurality of image processing servers 10 may be configured to cooperatively implement the processes of embodiments of the present invention as described above. The storage unit 1000 of the image processing server 10 does not necessarily have to be provided in the image processing server 10 as long as the image processing server 10 is capable of accessing the storage unit 1000 to read/write data from/on the storage unit 1000.

Also, although the functional features of the image processing server 10 and the image display terminal 30 have been described above by dividing then into several processing units, the present invention is not limited to the above arrangement and division of processing units. For example, one or more of the processing units of the image processing server 10 and/or the image display terminal 30 may be further divided into processing units, or two or more processing units may be combined into a single processing unit, for example.

Note that the image editing unit 15 described above is an example of a reduction unit, the communication unit 31 is an example of a receiving unit and a second transmitting unit, the operation input accepting unit 33 is an example of an operation accepting unit, the view region managing unit 13 is an example of a counting unit, the image display unit 32 is an example of an image display unit, the view region recording unit 35 is an example of a display region recording unit, the communication unit 11 is an example of a first transmitting unit, the data deletion determining unit 14 is an example of a region determining unit. Also, processing procedures executed by the image display system 100 according to the above embodiments of the present invention are examples of an image display method according to the present invention.

The present application is based on and claims the benefit of priority of Japanese Patent Application No. 2015-094225 filed on May 1, 2015 and Japanese Patent Application No. 2016-026816 filed on Feb. 16, 2016, the entire contents of which are hereby incorporated by reference.

What is claimed is:

1. An image display system comprising:
an information processing apparatus; and
a terminal apparatus,
wherein the information processing apparatus includes:
a memory for storing displayed wide-angle image data that corresponds to a displayed region of a wide-angle image that has been displayed; and
a first processor configured to execute processes of
incrementing a number of views of the displayed region of the wide-angle image, the number of views being stored in association with the displayed wide-angle image data,
determining a region of the wide-angle image that is viewed less frequently than other regions of the wide-angle image based on the number of views associated with the displayed wide-angle image data, corresponding to the displayed region of the wide-angle image, stored in the memory,
generating a reduced wide-angle image by deleting the determined less-frequently viewed region from the wide-angle image that has been displayed,
storing reduced wide-angle image data, corresponding to the reduced wide-angle image, in which data corresponding to the determined less-frequently viewed region is deleted from the displayed wide-angle image data, and
transmitting the reduced wide-angle image data to the terminal apparatus; and
wherein the terminal apparatus includes
a display device; and
a second processor configured to execute processes of
receiving the reduced wide-angle image data transmitted from the information processing apparatus,
displaying one portion of the wide-angle image, corresponding to the one portion of the received reduced wide-angle image data, on the display device, and
displaying another portion of the wide-angle image, corresponding to another portion of the received reduced wide-angle image data that is different from the one portion, on the display device, in response to an input from a user.

2. The image display system according to claim 1, wherein the first processor further:
calculates a ratio of a number of views to a number of receptions of the display information with respect to each of the plurality of partitioned regions, and determines that a partitioned region in which the calculated ratio is below a threshold as the less-frequently viewed region of the wide-angle image.

3. The image display system according to claim 1, wherein the first processor further:
identifies, from among the plurality of partitioned regions, a prescribed number of partitioned regions, which have a greater number of views than other partitioned regions, or a higher ratio of a number of views to a number of receptions of the display information than the other partitioned regions, and determines the identified prescribed number of partitioned regions as the less-frequently viewed region of the wide-angle image.

4. The image display system according to claim 3, wherein the first processor further:
changes the prescribed number based on a bandwidth between the information processing apparatus and the terminal apparatus.

5. The image display system according to claim 1, wherein
the second processor further:
transmits the display region information to the information processing apparatus together with user information relating to a user of the terminal apparatus; and
the first processor further:
determines the less-frequently viewed region of the wide-angle image with respect to each individual user based on the display region information and the user information received from the terminal apparatus; and
deletes the determined less-frequently viewed region of the wide-angle image with respect to each individual user from the wide-angle image to generate the reduced wide-angle image with respect to each individual user.

6. The image display system according to claim 5, wherein
the determining of the less-frequently viewed region of the wide-angle image with respect to each individual user includes determining the less-frequently viewed region of the wide-angle image based on the display region information transmitted by a different user other than a viewing user viewing the wide-angle image.

7. The image display system according to claim 1, wherein the second processor further:

accepts an operation for causing the display device to display the region deleted from the wide-angle image; and requests the information processing apparatus to transmit at least the region deleted from the wide-angle image when the operation for causing the display device to display the region deleted from the wide-angle image.

8. The image display system according to claim 7, wherein the operation for causing the display device to display the region deleted from the wide-angle image includes:
controlling the display device to continually display a region of the reduced wide-area image, corresponding to the region deleted from the wide-angle image, for at least a predetermined time period.

9. The image display system according to claim 7, wherein the operation for causing the display device to display the region deleted from the wide-angle image includes:
controlling the display device to alternatingly display one of a plurality of regions of the reduced wide-angle image, split by the deleted region, for at least a predetermined number of times within a predetermined period of time.

10. The image display system according to claim 7, wherein
the second processor further:
accepts a designation operation designating a region of a the wide-angle image displayed on the display device;
transmits information relating to the designated region to the information processing apparatus; and
the first processor further:
deletes the designated region from the wide-angle image based on the information relating to the designated region.

11. The image display system according to claim 1, wherein
the second processor further:
records image capturing time information relating to an image capturing time of the wide-angle image together with the display region of the wide-angle image that is displayed on the display device, and
transmits the image capturing time information and the display region information recorded by the display region recording unit to the information processing apparatus; and
the first processor further:
determines the less-frequently viewed region of the wide-angle image with respect to each time slot of a plurality of time slots by determining a relevant time slot from among the plurality of time slots to which the image capturing time information of the wide-angle image belongs, and
deletes the determined less-frequently viewed region from the wide-angle image with respect to each time slot.

12. The image display system according to claim 11, wherein the first processor further:
aggregates the display region information associated with two or more different time slots of the plurality of time slots; and
determines the less-frequently viewed region of the wide-angle image based on the aggregated display region information.

13. The image display system according to claim 1, wherein the second processor further:
records day-of-the week information relating to a day of the week on which the wide-angle image has been captured together with the display region of the wide-angle image that is displayed on the display device,
transmits the recorded day-of-the-week information and the display region information to the information processing apparatus; and
the first processor further:
determines the less-frequently viewed region of the wide-angle image with respect to each day of the week by determining the day of the week on which the wide-angle image has been captured based on the received day-of-the-week information, and
deletes the determined less-frequently viewed region from the wide-angle image with respect to each day of the week.

14. The image display system according to claim 1, wherein
the wide-angle image is an omnidirectional image; and
the first processor further:
determines whether the omnidirectional image is one of a plurality of the omnidirectional images captured while changing an image capturing position; and
when the omnidirectional image is one of the plurality of omnidirectional images,
determines at least one of a sky region and a ground region of the omnidirectional image, a rear range of the omnidirectional image opposite a moving direction of the image capturing position, or a region other than a field of view region of the omnidirectional image within a predetermined range from the moving direction of the image capturing position as a region to be deleted from the omnidirectional image; and
deletes the region to be deleted determined by the region determining unit from the omnidirectional image.

15. An information processing apparatus comprising:
a memory for storing displayed wide-angle image data that corresponds to a displayed region of a wide-angle image that has been displayed; and
a processor configured to execute processes of
incrementing a number of views of the displayed region of the wide-angle image, the number of views being stored in association with the displayed wide-angle image data,
determining a region of the wide-angle image that is viewed less frequently than other regions of the wide-angle image based on the number of views associated with the displayed wide-angle image data, corresponding to the displayed region of the wide-angle image, stored in the memory,
generating a reduced wide-angle image by deleting the determined less-frequently viewed region from the wide-angle image that has been displayed,
storing reduced wide-angle image data, corresponding to the reduced wide-angle image, in which data corresponding to the determined less-frequently viewed region is deleted from the displayed wide-angle image data, and
transmitting the reduced wide-angle image data to the terminal apparatus.

16. An image display method implemented by an information processing system including an information processing apparatus and a terminal apparatus, the image display method comprising:
- incrementing, by the information processing apparatus, a number of views of the displayed region of the wide-angle image, the number of views being stored in association with the displayed wide-angle image data;
- determining, by the information processing apparatus, a region of the wide-angle image that is viewed less frequently than other regions of the wide-angle image based on the number of views associated with the displayed wide-angle image data, corresponding to the displayed region of the wide-angle image, stored in the memory;
- generating, by the information processing apparatus, a reduced wide-angle image by deleting the determined less-frequently viewed region from the wide-angle image that has been displayed;
- storing, by the information processing apparatus, reduced wide-angle image data, corresponding to the reduced wide-angle image, in which data corresponding to the determined less-frequently viewed region is deleted from the displayed wide-angle image data;
- transmitting, by the information processing apparatus, reduced wide-angle image data to the terminal apparatus;
- receiving, by the terminal apparatus, the reduced wide-angle image data transmitted from the information processing apparatus;
- displaying, by the terminal apparatus, one portion of the wide-angle image corresponding to the one portion of the received reduced wide-angle image data on the display device; and
- displaying, by the terminal apparatus, another portion of the wide-angle image corresponding to another portion of the received reduced wide-angle image data that is different from the one portion on the display device, in response to an input from a user.

* * * * *